United States Patent
Ho et al.

(10) Patent No.: US 9,792,659 B2
(45) Date of Patent: Oct. 17, 2017

(54) COMPUTER-AIDED METHODS AND APPARATUS TO ACCESS MATERIALS IN A NETWORK ENVIRONMENT

(75) Inventors: Chi Fai Ho, Palo Alto, CA (US); John P. Del Favero, Machesney Park, IL (US); Peter P. Tong, Mountain View, CA (US)

(73) Assignee: IpLearn, LLC, Mountain View, CA (US)

( * ) Notice: Subject to any disclaimer, the term of this patent is extended or adjusted under 35 U.S.C. 154(b) by 2191 days.

(21) Appl. No.: 11/586,307

(22) Filed: Oct. 26, 2006

(65) Prior Publication Data

US 2007/0042333 A1    Feb. 22, 2007

Related U.S. Application Data

(63) Continuation of application No. 10/692,274, filed on Oct. 22, 2003, now Pat. No. 7,201,580, which is a
(Continued)

(51) Int. Cl.
*G09B 3/00* (2006.01)
*G06Q 50/20* (2012.01)
(Continued)

(52) U.S. Cl.
CPC ....... *G06Q 50/20* (2013.01); *G06F 17/30386* (2013.01); *G06Q 10/06313* (2013.01);
(Continued)

(58) Field of Classification Search
CPC . G09B 7/00; G09B 19/00; G09B 9/00; G09B 25/02
(Continued)

(56) References Cited

U.S. PATENT DOCUMENTS

| 3,233,346 A | 2/1966 | Cornberg |
| 3,573,359 A | 4/1971 | Guisinger ..................... 178/6.6 |

(Continued)

FOREIGN PATENT DOCUMENTS

| EA | 0 710 942 A2 | 8/1996 |
| GB | 2 289 3364 A | 11/1995 |

(Continued)

OTHER PUBLICATIONS www.ibm.com/developerwork/lotus/library/ls-elearning_evolution/, titled, "The evolution of Lotus e-Learning Software" by Elisabeth Bowling.
(Continued)

*Primary Examiner* — Robert J Utama

(57) ABSTRACT

A computer-aided learning method and apparatus for a learning user to learn materials inexpensively. Not only does the apparatus provide the user the freedom as to where and when to learn, and the guidance as to what to learn, the apparatus also reduces a significant hurdle to learning—money. The apparatus retrieves a user identifier entered by the user, and determines whether the user is a learning user or an institute user. If the user is a learning user, the apparatus allows the user to access information regarding learning materials. If the user is an institute user, the apparatus permits the user to access information regarding at least one learning user. The institute user might be interested to use the apparatus to recruit employees to fill job openings. A learning user pays significantly less than an institute user to access information, so as to encourage the learning user to work on learning materials. The apparatus can also track and update information regarding the users.

45 Claims, 8 Drawing Sheets

Related U.S. Application Data continuation of application No. 10/113,225, filed on Mar. 30, 2002, now Pat. No. 6,685,478, which is a continuation of application No. 09/290,770, filed on Apr. 13, 1999, now Pat. No. 6,398,556.

(51) Int. Cl.

| | | |
|---|---|---|
| *G09B 19/00* | (2006.01) | |
| *G06F 17/30* | (2006.01) | |
| *G06Q 10/06* | (2012.01) | |
| *G06Q 30/02* | (2012.01) | |
| *G09B 5/12* | (2006.01) | |
| *G09B 7/00* | (2006.01) | |
| *G09B 7/02* | (2006.01) | |
| *G09B 5/00* | (2006.01) | |

(52) U.S. Cl.
CPC ..... *G06Q 30/0255* (2013.01); *G06Q 30/0269* (2013.01); *G09B 5/12* (2013.01); *G09B 19/00* (2013.01); *G09B 5/00* (2013.01); *G09B 7/00* (2013.01); *G09B 7/02* (2013.01)

(58) Field of Classification Search
USPC .............. 434/350, 219, 323, 322; 705/11
See application file for complete search history.

(56) References Cited

U.S. PATENT DOCUMENTS

| | | | |
|---|---|---|---|
| 4,006,539 A | 2/1977 | Slomski | 434/258 |
| 4,037,332 A | 7/1977 | Petrusinsky | 35/35 |
| 4,089,124 A | 5/1978 | Burtis et al. | |
| 4,464,121 A | 8/1984 | Perelli | 434/236 |
| 4,611,996 A | 9/1986 | Stoner | |
| 4,705,479 A | 11/1987 | Maron | |
| 4,798,543 A | 1/1989 | Spiece | |
| 4,847,784 A | 7/1989 | Clancey | |
| 4,867,685 A | 9/1989 | Brush et al. | 434/234 |
| 4,894,777 A | 1/1990 | Negishi et al. | 600/558 |
| 4,926,255 A | 5/1990 | Von Kohorn | |
| 5,002,491 A | 3/1991 | Abrahamson et al. | |
| 5,004,966 A | 4/1991 | Eakin | |
| 5,029,081 A | 7/1991 | Kagawa | |
| 5,035,625 A | 7/1991 | Monson et al. | |
| 5,099,431 A | 3/1992 | Natarajan | |
| 5,103,498 A | 4/1992 | Lanier et al. | |
| 5,117,353 A | 5/1992 | Stipanovich et al. | |
| 5,164,897 A | 11/1992 | Clark et al. | |
| 5,168,372 A | 12/1992 | Sweetser | |
| 5,173,051 A | 12/1992 | May et al. | |
| 5,176,520 A | 1/1993 | Hamilton | |
| 5,195,033 A | 3/1993 | Samph et al. | |
| 5,197,004 A | 3/1993 | Sobotka et al. | |
| 5,211,563 A | 5/1993 | Haga et al. | |
| 5,220,501 A | 6/1993 | Lawlor et al. | |
| 5,224,173 A | 6/1993 | Kuhns et al. | |
| 5,241,671 A | 8/1993 | Reed et al. | |
| 5,251,294 A | 10/1993 | Abelow | |
| 5,255,347 A | 10/1993 | Matsuba et al. | 706/25 |
| 5,257,185 A | 10/1993 | Farley et al. | |
| 5,259,766 A | 11/1993 | Sack et al. | |
| 5,263,869 A | 11/1993 | Ziv-El | |
| 5,267,865 A | 12/1993 | Lee et al. | |
| 5,270,920 A | 12/1993 | Pearse et al. | |
| 5,286,036 A | 2/1994 | Barabash | |
| 5,302,132 A | 4/1994 | Corder | |
| 5,306,154 A * | 4/1994 | Ujita et al. | 434/218 |
| 5,306,878 A | 4/1994 | Kubo | 187/380 |
| 5,310,349 A | 5/1994 | Daniels et al. | |
| 5,316,485 A | 5/1994 | Hirose | |
| 5,320,538 A | 6/1994 | Baum | |
| 5,326,270 A | 7/1994 | Ostby et al. | |
| 5,333,272 A | 7/1994 | Capek et al. | 715/727 |
| 5,344,326 A | 9/1994 | Ferris | |
| 5,362,069 A | 11/1994 | Hall-Tipping | |
| 5,370,399 A | 12/1994 | Liverance | |
| 5,372,507 A * | 12/1994 | Goleh | 434/118 |
| 5,387,104 A | 2/1995 | Corder | |
| 5,395,243 A | 3/1995 | Lubin et al. | |
| 5,411,271 A | 5/1995 | Mirando | |
| 5,416,694 A | 5/1995 | Parrish et al. | |
| 5,418,717 A | 5/1995 | Su et al. | |
| 5,421,730 A | 6/1995 | Lasker, III et al. | |
| 5,434,562 A | 7/1995 | Reardon | |
| 5,437,553 A | 8/1995 | Collins et al. | |
| 5,437,555 A | 8/1995 | Ziv-El | |
| 5,441,415 A | 8/1995 | Lee et al. | |
| 5,458,494 A | 10/1995 | Krohn et al. | |
| 5,494,444 A * | 2/1996 | Thayer et al. | 434/362 |
| 5,506,984 A | 4/1996 | Miller | |
| 5,535,422 A | 7/1996 | Chiang et al. | |
| 5,546,598 A | 8/1996 | Yamaguchi et al. | 345/301 |
| 5,577,188 A | 11/1996 | Zhu | |
| 5,577,919 A | 11/1996 | Collins et al. | 434/322 |
| 5,592,375 A | 1/1997 | Salmon et al. | |
| 5,597,312 A | 1/1997 | Bloom et al. | |
| 5,616,033 A | 4/1997 | Kerwin | |
| 5,618,182 A | 4/1997 | Thomas | |
| 5,657,256 A | 8/1997 | Swanson et al. | |
| 5,681,170 A | 10/1997 | Rieber et al. | |
| 5,692,906 A | 12/1997 | Corder | |
| 5,724,987 A | 3/1998 | Gevins et al. | |
| 5,727,950 A * | 3/1998 | Cook et al. | 434/350 |
| 5,727,951 A | 3/1998 | Ho et al. | |
| 5,730,604 A * | 3/1998 | Jay et al. | 434/365 |
| 5,738,527 A | 4/1998 | Lundberg | |
| 5,743,743 A | 4/1998 | Ho et al. | |
| 5,743,746 A | 4/1998 | Ho et al. | |
| 5,754,939 A | 5/1998 | Herz et al. | |
| 5,758,079 A | 5/1998 | Ludwig et al. | 709/204 |
| 5,758,324 A | 5/1998 | Hartman et al. | |
| 5,767,897 A | 6/1998 | Howell | 348/15 |
| 5,788,504 A * | 8/1998 | Rice et al. | 434/219 |
| 5,788,508 A | 8/1998 | Lee et al. | |
| 5,794,001 A | 8/1998 | Malone et al. | |
| 5,794,178 A | 8/1998 | Caid et al. | |
| 5,794,207 A | 8/1998 | Walker et al. | |
| 5,794,210 A | 8/1998 | Goldhaber et al. | |
| 5,797,753 A | 8/1998 | Griswold et al. | |
| 5,797,754 A * | 8/1998 | Griswold et al. | 434/322 |
| 5,799,292 A | 8/1998 | Hekmatpour | |
| 5,799,315 A | 8/1998 | Rainey et al. | |
| 5,807,114 A | 9/1998 | Hodges et al. | |
| 5,809,493 A | 9/1998 | Ahamed et al. | 706/52 |
| 5,810,605 A | 9/1998 | Siefert | |
| 5,820,386 A | 10/1998 | Sheppard, II | |
| 5,823,781 A | 10/1998 | Hitchcock et al. | |
| 5,829,983 A * | 11/1998 | Koyama et al. | 434/118 |
| 5,832,497 A | 11/1998 | Taylor | |
| RE36,028 E | 1/1999 | Deesen et al. | |
| 5,862,325 A | 1/1999 | Reed et al. | |
| 5,867,799 A | 2/1999 | Lang et al. | |
| 5,879,165 A | 3/1999 | Brunkow et al. | |
| 5,880,731 A | 3/1999 | Liles et al. | |
| 5,884,270 A | 3/1999 | Walker et al. | |
| 5,892,900 A | 4/1999 | Ginter et al. | |
| 5,896,128 A | 4/1999 | Boyer | 715/716 |
| 5,904,485 A | 5/1999 | Siefert | 434/322 |
| 5,907,831 A | 5/1999 | Lotvin et al. | 705/14 |
| 5,920,861 A | 7/1999 | Hall et al. | |
| 5,957,699 A | 9/1999 | Peterson et al. | |
| 5,978,768 A | 11/1999 | McGovern et al. | |
| 5,987,302 A * | 11/1999 | Driscoll et al. | 434/353 |
| 5,999,908 A | 12/1999 | Abelow | |
| 6,006,191 A | 12/1999 | DiRienzo | |
| 6,024,577 A | 2/2000 | Wadahama et al. | |
| 6,031,577 A | 2/2000 | Ozkan et al. | |
| 6,033,226 A | 3/2000 | Bullen | 434/219 |
| 6,034,652 A | 3/2000 | Freiberger et al. | 715/730 |
| 6,039,575 A | 3/2000 | L'Allier et al. | 434/323 |
| 6,041,311 A | 3/2000 | Chislenko et al. | |
| 6,053,739 A | 4/2000 | Stewart et al. | 434/236 |
| 6,077,085 A | 6/2000 | Parry et al. | 434/322 |

(56) References Cited

U.S. PATENT DOCUMENTS

| | | | |
|---|---|---|---|
| 6,099,320 | A | 8/2000 | Papadopoulos |
| 6,119,097 | A | 9/2000 | Ibarra |
| 6,126,448 | A | 10/2000 | Ho et al. |
| 6,139,330 | A | 10/2000 | Ho et al. |
| 6,141,529 | A | 10/2000 | Remschel ............... 434/350 |
| 6,146,148 | A | 11/2000 | Stuppy .................. 434/322 |
| 6,149,438 | A * | 11/2000 | Richard et al. ........... 434/322 |
| 6,149,441 | A * | 11/2000 | Pellegrino et al. ......... 434/350 |
| 6,157,808 | A | 12/2000 | Hollingsworth |
| 6,162,060 | A * | 12/2000 | Richard et al. ........... 434/118 |
| 6,186,794 | B1 | 2/2001 | Brown et al. ............. 434/116 |
| 6,190,178 | B1 | 2/2001 | Oh |
| 6,213,780 | B1 | 4/2001 | Ho et al. |
| 6,233,600 | B1 | 5/2001 | Salas et al. |
| 6,282,630 | B1 | 8/2001 | Nguyen et al. |
| 6,292,830 | B1 | 9/2001 | Taylor et al. ............. 709/201 |
| 6,301,462 | B1 * | 10/2001 | Freeman et al. ........... 434/350 |
| 6,396,954 | B1 | 5/2002 | Kondo .................... 382/224 |
| 6,471,521 | B1 | 10/2002 | Dornbush et al. .......... 434/322 |
| 6,665,835 | B1 | 12/2003 | Gutfreund et al. |
| 6,685,478 | B2 | 2/2004 | Ho et al. |
| 7,201,580 | B2 | 4/2007 | Ho et al. |
| 2001/0011280 | A1 | 8/2001 | Gilbert et al. |
| 2001/0037376 | A1 | 11/2001 | Ullman et al. |
| 2001/0055749 | A1 | 12/2001 | Siefert |
| 2002/0098464 | A1 | 7/2002 | Ho et al. |
| 2004/0142312 | A1 | 7/2004 | Ho et al. |
| 2016/0314495 | A1 | 10/2016 | Ho et al. |
| 2016/0614551 | | 10/2016 | Ho et al. |

FOREIGN PATENT DOCUMENTS

| | | |
|---|---|---|
| WO | WO 96/39668 | 12/1996 |
| WO | WO 98/30965 | 7/1998 |
| WO | WO 99/54835 | 10/1999 |
| WO | WO 00/02178 | 1/2000 |

OTHER PUBLICATIONS

Cliffs StudyWare for the GED by Cliffs Notes, Inc., pp. 1-44, with 4 introductory pages, 1994.
Cliff StudyWare for the GRE by Cliffs Notes, Inc., pp. 1-48, with 4 introductory pages, 1993.
A Convenient Way to Organize and Install PCM 1.2 (and Wintracs) on NT Server, CBT Knowledge Base, Lee Prouty, Jan. 2, 1998, 2 pages.
The Detours Leading to the Discovery of Fission, Journal of Chemical Education, G. L. Breneman, vol. 56, No. 12, Dec. 1979, cover, pp. 781-783.
CMI Guidelines for Interoperability, AICC, Original Release Date of Oct. 25, 1993, Revision 1.6, Release Apr. 25, 1996, pp. i-xii, 1-253.
Computer Recognition of Human Faces, by Takeo Kanade, Interdisciplinary Systems Research, Birkhauser Verlag, Basel und Stuttgart, 1977, cover and 2 additional pages, pp. i-iv, 1-87, 89-91, 93-96, and 2 additonal pages at the end.
Title on CD: PLAT-D 04 to PLAT-D 27 PLAT-D05: PWR Operator, "Generic Fund. Exam. Bank, Rev. 3 File Name: PWR97.Doc Generic Fundamentals Examination 1997 PWR," Jan. 1995 (date shown in document, not sure if it is a publication date), 21 pages.
Title on CD: PLAT-D 04 to PLAT-D 27 PLAT-D06: PWR Operator, Generic Fund. Exam. Bank, Rev. 2 File Name: Readme 1996 pwr.doc "Generic Fundamentals Exam Bank Update," Dec. 1995 (date shown in document, not sure if it is a publication date), 22 pages.
Title on CD: PLAT-D 04 to PLAT-D 27 PLAT-D 07: BWR Operator, Generic Fund. Exam. Bank, Rev. 3 File Name: Readme.bwr "Generic Fundamentals Exam Bank Update," Jan. 1995 (date shown in document, not sure if it is a publication date), 42 pages.
Title on CD: PLAT-D 47 Where in the World is Carmen SanDiego? Junior Detective Edition File Name: Readme.txt "Where in the World is Carmen SanDiego? Junior Detective Edition, version 1.0," copyright 1994, Broderbund Software, Inc.
Title on CD: PLAT-D 60 CD-ROM to accompany Web-Based Training Cookbook, SKS00023432, May 13, 2003 File Name: Demo/3Dog/Readme.txt "CDE Readme, v1.0," Apr. 15, 1997 (shown in document, not sure if it is a publication date).
Title on CD: PLAT-D 60 CD-ROM to accompany Web-Based Training Cookbook, SKS00023432, May 13, 2003 File Name: Demo/QMARK/Readme.txt "Question Mark for Windows Version 3," copyright Question Mark Computing LTD 1993-1996, Question Mark America 1995-1996.
Title on CD: PLAT-D 61 LOTUS GUPTA File Name: CCMUSE/ CC_MSG.txt "Please note that the questions in this course are there to encourage you to stop and think," copyright 1995 by Lotus Development Corp.
Title on CD: PLAT-D 61 LOTUS GUPTA File Name: LNAD1F/ AD_MSG.txt "Questions in this course are of two types: discovery or review," copyright 1994 by CBT systems Ltd., and copyright 1994 by Lotus Development Corp.
Title on CD: PLAT-D 61 LOTUS GUPTA File Name: MOVEPB/ MP_MSG.txt "Please note that questions in this course are there to encourage you to stop and think," copyright 1994 by Powersoft Corporation.
Title on CD: PLAT-D 61 LOTUS GUPTA File Name: PB ASICS /AP_MSG.txt "Please note that questions in this course are there to encourage you to stop and think," copyright 1995 by Powersoft Corporation.
Title on CD: PLAT-D 61 LOTUS GUPTA File Name: SQLWAPT/ Readme.txt "Student Registration to CBT Courses," Apr. 7, 1995 (shown in document, not sure if it is a publication date.).
Title on CD: PLAT-D 61 LOTUS GUPTA File Name: TCPUN/ TU_MSG.txt "Please note that the questions in this course are designed to encourage you to stop and think," copyright 1995.
Title on CD: PLAT-D 61 LOTUS GUPTA File Name: WUNOS2NT/Readme.txt "Student registration to CBT courses," Apr. 7, 1995 (shown in document, not sure if it is a publication date).
Title on CD: PLAT-D 63 Math Blaster Jr. File Name: ACRO/ ACTBK.pdf "Math Blaster Jr. Activity Book," Davidson & Associates, Inc., copyright 1996, 32 pages.
Title on CD: PLAT-D 63 Math Blaster Jr. File Name: Previews/ Readme.txt "Davidson Product Previews v1.5c System Requirements," Davidson & Associates, Inc., copyright 1996.
Title on CD: PLAT-D 63 Math Blaster Jr. File Name: Previews/ SVGA/Readme.txt "Windows 3.1 256 Color Display Driver Release Notes," Microsoft Corporation, copyright 1993.
Title on CD: PLAT-D 63 Math Blaster Jr. File Name: Previews/ VFW1_1/Readme.txt "Microsoft(R) Product Support Services Application Note," Microsoft Corporation, Revision Date Mar. 1995 (shown in document, not sure if it is a publication date).
Title on CD: REEVES-D01 to D42 and QM—D01 to D05 REEVES-D 20: Disk 2 Operating, for the Leading Edge, Model D Series PC File Name: Readme.txt "This document covers topics not included in MS-DOS printed documentation," Dec. 1, 1988 (shown in document, not sure if it is a publication date.).
Title on CD: REEVES-D01 to D42 and QM—D01 to D05 z QM-D01: Question Mark Designer, Disk 2 of 4 File Name: Readme.txt "Question Mark Designer for Windows Version 3.21 READ.ME," Mar. 8, 1999 (shown in document, not sure if it is a publication date.).
Title on CD: REEVES-D01 to D42 and QM-D01 to D05 z QM-D02: Question Mark Designer, Disk 1 of 4 File Name: Testview.txt "Testview—Windows Viewer for Question Mark Test Files," Mar. 8, 1999 (shown in document, not sure if it is a publication date), copyright 1993-1998 by Question mark Computing Ltd.
Title on CD: QM-D 06 QM 2.14, DOS DEMO Manuals File Name: Win214/Disk1/Readme.txt "Question Mark for Windows Version 2.14 Read.Me," Feb. 23, 1996 (shown in document, not sure if it is a publication date.).
Title on CD: QM-D 06 QM 2.14, DOS DEMO Manuals File Name: Win214/Disk3/QD_View.txt "QD_View—Windows Viewer for

(56) References Cited

OTHER PUBLICATIONS

Question Mark Test Files," Feb. 23, 1996 (shown in document, not sure if it is a publication date), copyright 1993-1995 by Question mark Computing Ltd.
Title on CD: PLAT-CD 05 Plateau Win CMI 2 & 3 File Name: CMI21E/Complete/Readme.txt "Sensory Computing Inc. Windows CMI/CBT Readme Nov. 4, 1996," Nov. 4, 1996 (shown in document, not sure if it is a publication date), copyright 1996 by Sensory Computing Inc.
Title on CD: PLAT-CD 05 Plateau Win CMI 2 & 3 File Name: CMI21E/Complete/Tech.doc "CBT Courseware Technical Note," copyright May 1996 by Sensory Computing, Inc., 4 pages.
Title on CD: PLAT-CD 05 Plateau Win CMI 2 & 3 File Name: Wincmi 3.2 Install/Image/Network.doc "Windows CBT Server Attachment and Drive Mapping," copyright May 1996 by Sensory Computing, Inc., 2 pages.
Title on CD: PLAT-CD 05 Plateau Win CMI 2 & 3 File Name: Wincmi 3.2 Install/Image/Readme.doc "Welcome to the Windows CMI Version 3.0," copyright May 1998 by Sensory Computing, Inc., 4 pages.
Title on CD: PLAT-CD 05 Plateau Win CMI 2 & 3 File Name: Wincmi 3.2 Install/Image/Tencore.doc "TenCORE and Producer Lesson Startup in the Windows CBT," copyright May 1996 by Sensory Computing, Inc., 1 page.
Title on CD: PLAT-CD 07 Sensory Computing Inc. SCI.ADMIN v1.0 File Name: Manual/Obeman.rtf Parker et al., "SCI. Objective Bank Editor Manual," copyright 1997, Sensory Computing, Inc., 38 pages.
Title on CD: GYRUS-D 01 Training Wizard 97', EvalTracker File Name: MSNOTES.TXT "Training Wizard 97 Plus Installation Notes for Microsoft SQL Server 6.x, Version 1.0.70.0," copyright 1996, 1997 by Gyrus Systems, Inc.
Title on CD: GYRUS-D 01 Training Wizard 97', EvalTracker File Name: ORANOTES.TXT "Training Wizard 97 Plus Installation Notes for Oracle 7.x Server, Version 1.0.70.0," copyright 1996, 1997 by Gyrus Systems, Inc.
Title on CD: GYRUS-D 01 Training Wizard 97', EvalTracker File Name: RELNOTES.TXT "Training Wizard 97 Release Notes, Version 1.0.70.0," copyright 1996, 1997 by Gyrus Systems, Inc.
Title on CD: GYRUS-D 01 Training Wizard 97', EvalTracker File Name: SSTNOTES.TXT "Self Service Training for Training Wizard 97 Release Notes, Version 1.0.70.0," copyright 1996, 1997 by Gyrus Systems, Inc.
Title on CD: GYRUS-D 01 Training Wizard 97', EvalTracker File Name: UPGRADE.TXT "Training Wizard 97 Upgrade," Jul. 18, 1997 (shown in document, not sure if it is a publication date.).
Title on CD: GYRUS-D 01 Training Wizard 97, EvalTracker File Name: WATNOTES.TXT "Training Wizard 979 Plus Installation Notes for Watcom SQL Server 4.0d, Version 1.0.70.0," copyright 1996, 1997 by Gyrus Systems, Inc.
Title on CD: PLAT-CD 05 Plateau Win CMI 2 & 3 File Name: Wincmi 3.2 Install/Manual/Wincmi.doc "The CMI Handbook, version 3.0," copyright 1998 by Sensory Computing, Inc., 109 pages.
Title on CD: PLAT-CD 07 Sensory Computing Inc. SCI.ADMIN v1.0 File Name: Manual/Samanual.rtf Ward et al., "SCI. Admin Administrator Reference," copyright 1997, Sensory Computing, Inc., 161 pages.
Title on CD: GYRUS-D 01 Training Wizard 97', EvalTracker File Name: CRWGUIDE/DEVGUIDE.PDF Carter et al., "Crytal Reports Developer's Reference," copyright 1992, 1993, 1994, 1995, Crystal, 214 pages.
Title on CD: GYRUS-D 01 Training Wizard 97', EvalTracker File Name: CRWGUIDE/USRGUIDE.PDF Carter et al., "Crystal Reports User's Guide," copyright 1992, 1993, 1994, 1995, Crystal, 205 pages.
Curtis, Pavel, "PlaceWare: From Research to Product Service to Tomorrow," PlaceWare: A Microsoft Company, from Workshop on Advanced Collaboration Environments, Jun. 22, 2003.
Driscoll, M. et al., "The Web as a Learning Environment," IEEE, 1997, pp. 333-338.

Goldberg, M.W., et al. "World Wide Web—Course Tool: An Environment for Building WWW-Based Courses," Computer Networks and ISDN Systems, vol. 28, issues 7-11, 1996, 14 pgs.
Keeling, Roger, "Education 2010," Newman Software, Research Machines, NCET, Pub. Newman Software, 1989, 83 pgs.
Kellerman, As et al. "Adaptive Computer Assisted Instruction," http://www.ip.com/pubview/IPCOM000070122D, Feb. 21, 2005, 2 pgs.
Khan, Badrul Huda, "Web-based instruction," University of Texas, Brownsville, Educational Technology Publications, $2^{nd}$ Ed., Feb. 1, 1997, 463 pgs.
Lu, I.M., et al. "Idea Management in a Shared Drawing Tool," Proceedings of the Second European Conference on Computer-Supported Cooperative Work, Sep. 25-27, 1991, pp. 97-112.
Thommen, John D., "Using Testbanking to Implement Classroom Management/Extension through the Use of Computers," Lansing Community College, Nov. 6, 1992, 6 pgs.
van Merrienboer, J.J.G., et al. "Fuzzy Logic Instructional Models: The Dynamic Construction of Programming Assignments in CASCO," Automated Instructional Design: Computer-Based Development and DeliveryTools, Chapter 11, pp. 265-302, Tennyson, R.D., et al. (eds.) © Springer-Verlag Berlin Heildelberg 1995.
Element's Answer to First Amended Complaint for Patent Infringement, C.A. No. 1:11-cv-00825-LPS, filed Nov. 1, 2011, pp. 1-30.
Lawson's Answer to First Amended Complaint for Patent Infringement, C.A. No. 1:11-cv-00825-LPS, filed Nov. 2, 2011, pp. 1-27.
Trivantis' Answer and Counterclaim to Plaintiff's First Amended Complaint for Patent Infringement, C.A. No. 1:11-cv-00825-LPS, filed Nov. 11, 2011, pp. 1-13.
Ultimate's Answer to First Amended Complaint for Patent Infringement, C.A. No. 1:11-cv-0825-LPS, filed Nov. 14, 2011, pp. 1-26.
Pearson's Answer, Affirmative Defenses, and Counterclaims of NCS Pearson, Inc., C.A. No. 1:11-cv-00825-LPS, filed Nov. 28, 2011, pp. 1-21.
Connections' Answer to Plaintiff's First Amended Complaint for Patent Infringement, C.A. No. 1:11-cv-00825-LPS, filed Nov. 28, 2011, pp. 1-19.
Beeline's Answer, Defenses, and Counterclaims to Plaintiff IpLearn's First Amended Complaint, C.A. No. 1:11-cv-00825-LPS, filed Dec. 5, 2011, pp. 1-26.
Cengage's Answer and Counterclaim to Plaintiff's First Amended Complaint for Patent Infringement, C.A. No. 1:11-cv-00825-LPS, filed Dec. 13, 2011, pp, 1-10.
Kenexa's Answer to First Amended Complaint and Counterclaims, C.A. No. 1:11- cv-00825-LPS, filed Jan. 5, 2012, pp. 1-19.
Halogen's Answer and Counterclaim to Plaintiff's First Amended Complaint, C.A. No. 1:11-cv-00825-LPS, filed Jan. 19, 2012, pp. 1-27.
Mzings's Answer and Counterclaim to Plaintiff's First Amended Complaint, C.A. No. 1:11-cv-00825-LPS, filed Jan. 19, 2012, pp. 1-27.
Opertitel's Answer, Affirmative Defenses, and Counterclaims to Plaintiff IpLearn, LLC's First Amended Complaint for Patent Infringement, C.A. No. 1:11-cv-00825-LPS, filed Feb. 3, 2012, pp. 1-26.
Technomedia's Answer and Counterclaims to Plaintiff's First Amended Complaint, C.A. No. 1:11-cv-00825-LPS, filed Feb. 14, 2012, pp. 1-28.
Oracle's Answer to First Amended Complaint for Patent infringement, C.A. No. 1:11-cv-00825-RGA, filed Jul. 16, 2012, pp. 1-20.
K12's Answer to IpLearn's First Amended Complaint, C.A. No. 1:11-cv-01026-RGA, filed Jul. 16, 2012, pp. 1-10.
Blackboard's Answer to Plaintiff's Complaint for Patent Infringement, Affirmative Defenses and Counterclaims, C.A. No. 1:11-cv-00876-LPS, filed Nov. 21, 2011, pp. 1-18.
About KnowledgeSoft, http://web.archive.org/web/19970330114029/http://knowledgesoft. com/about/about.htm, http://web.archive.org/web/19970625102921/http://www.knowledgesoft.com/products/screens.htm, http://web.archive.org/web/19970330114045/ http:/www.knowledgesoft.com/products/products.htm, allegedly dated Mar. 3, 1997, download date Nov. 12, 2012, 17 pages.

(56) References Cited

OTHER PUBLICATIONS

"KnowledgeSoft Enters Agreement with Centra Software to Offer Live Instructor-led Training Over the Web," http://web.archive.org/web/19970625102115/http://www.knowledgesoft.com/press/centra2.htm, allegedly dated Feb. 12, 1997, download date Nov. 12, 2012, 2 pages.
"KnowledgeSoft, Inc. Releases LOIS—Learning Organization Information System — the First "Knowledge Management" Software for Corporations," http://web.archive.org/web/19970625102140/http://www.knowledgesoft.com/press/announc.htm, allegedly dated Sep. 6, 1996, download date Nov. 12, 2012, 2 pages.
"Web-Based Training Cookbook: Everything you need to know for online training," Chapter Ten: Program Administration, © 1997 Brandon Hall, 26 pages.
Part 1: Pathlore Learning Management System, "Classroom Learning Administration," Release 4.0, allegedly dated 2000, 148 pages.
Part 2: Pathlore Learning Management System, "Classroom Learning Administration," Release 4.0, allegedly dated 2000, 151 pages.
Part 3: Pathlore Learning Management System, "Classroom Learning Administration," Release 4.0, allegedly dated 2000, 173 pages.
Registrar® for Windows® User's Guide, Release 5.3, Ch. 1, 5, 6, 7 and 12, SiltonBookman Systems, allegedly dated Jun. 1996, 32 pages.
Silton-Bookman Systems Product Overview, "Training administration software that lets you see and do things your way. Automatically." http://web.archive.org/web/19970108014035/http://www.sbsinc.com/overview.html, allegedly dated Jan. 8, 1997, download date Jan. 2, 2013, 5 pages.
"Your Personal Trainer for the Act 1.0," © 1995 Davidson & Associates, Inc., 21 pages.
"Davidson & Associates Announces New Test Preparation Software for ACT and GRE College Entrance Exams at E3," PR Newswire, May 11, 1995, 6 pages.
"Anxious About College Admissions and the SAT? Students Find Solace in 10 New Products from Kaplan Educational Centers," PR Newswire, Aug. 14, 1995, 2 pages.
"Kaplan SAT RoadTrip 96 & College Search User's Guide," allegedly dated 1995, 22 pages.
Frasson, Claude, "Some Characteristics of Instructional Design for Industrial Training," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page And pp. 1-8.
Giroux, S., et al., "Epiphyte Advisor Systems for Collaborative Learning," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page And pp. 42-50.
Huang, Sherman X., "On Content-Balanced Adaptive Testing," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 60-68.
Looi, C. et al. "WORDMATH: A Computer-Based Environment for Learning Word Problem Solving," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 78-86.
Mangelle, T. et al. "A Multi-Agent Architecture for an ITS with Multiple Strategies," Lecture Notes in Computer Science: Computer Aided Learning and Instruction in Science and Engineering, Third International Conference, CALISCE'96, San Sebastian, Spain, Jul. 1996 Proceedings, A. Diaz de Illarraza Sanchez and I. Fernandez de Castro (Eds.), Cover Page and pp. 96-104.
Patel, A. et al. "Applied Artificial Intelligence for Teaching Numeric Topics in Engineering Disciplines," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 132-140.
Pescador, F. et al. "Authoring System for Reinforcement and Evaluation (Sare)," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 195-203.
Parodi G. et al. "Cooperative and Distance Learning in Electronics Using Internet," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 213-219.
Warkentyne, H.M.K. et al. "Implementation and Evaluation of a WWW Multiple Choice Question Server," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez, I. Fernandez de Castro (Eds.), Cover Page and pp. 228-235.
Baniulis, K. et al. "Flexible Intelligent Environment for Tutoring and Assessing Learners," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 424-426.
Bender-Oberg, A. et al. "DLW—A Learning Environment for Lake Water Diagnosis," Lecture Notes in Computer Science: Computer Aided Learning and Instruction in Science and Engineering, Third International Conference, CALISCE '96, San Sebastian, Spain, Jul. 1996 Proceedings, A. Diaz de Illarraza Sanchez and I. Fernandez de Castro (Eds.), Cover Page and pp. 427-429.
Oracle Corporation's Invalidity Contentions, C.A. No. 11-825(RGA), filed Mar. 1, 2013, pp. 1-106.
Exhibit A.1, Oracle Corporation's Invalidity Contentions, C.A. No. 11-825 (RGA), filed Mar. 1, 2013, pp. 1-57.
Exhibit A.2, Oracle Corporation's Invalidity Contentions, C.A. No. 11-825 (RGA), filed Mar. 1, 2013, pp. 1-43.
Exhibit A.3, Oracle Corporation's Invalidity Contentions, C.A. No. 11-825 (RGA), filed Mar. 1, 2013, pp. 1-55.
Exhibit B.1, Oracle Corporation's Invalidity Contentions, C.A. No. 11-825 (RGA), filed Mar. 1, 2013, pp. 1-13.
Exhibit B.2, Oracle Corporation's Invalidity Contentions, C.A. No. 11-825 (RGA), filed Mar. 1, 2013, pp. 1-17.
Exhibit B.3, Oracle Corporation's Invalidity Contentions, C.A. No. 11-825 (RGA), filed Mar. 1, 2013, pp. 1-23.
Exhibit B.4, Oracle Corporation's Invalidity Contentions, C.A. No. 11-825 (RGA), filed Mar. 1, 2013, pp. 1-17.
Exhibit C.1, Oracle Corporation's Invalidity Contentions, C.A. No. 11-825 (RGA), filed Mar. 1, 2013, pp. 1-91.
Exhibit C.2, Oracle Corporation's Invalidity Contentions, C.A. No. 11-825 (RGA), filed Mar. 1, 2013, pp. 1-154.
Exhibit C.3, Oracle Corporation's Invalidity Contentions, C.A. No. 11-825 (RGA), filed Mar. 1, 2013, pp. 1-60.
Exhibit C.4, Oracle Corporation's Invalidity Contentions, C.A. No. 11-825 (RGA), filed Mar. 1, 2013, pp. 1-62.
Exhibit C.5, Oracle Corporation's Invalidity Contentions, C.A. No. 11-825 (RGA), filed Mar. 1, 2013, pp. 1-50.
Exhibit C.6, Oracle Corporation's Invalidity Contentions, C.A. No. 11-825 (RGA), filed Mar. 1, 2013, pp. 1-47.
Exhibit D.1, Oracle Corporation's Invalidity Contentions, C.A. No. 11-825 (RGA), filed Mar. 1, 2013, pp. 1-119.
Exhibit D.2, Oracle Corporation's Invalidity Contentions, C.A. No. 11-825 (RGA), filed Mar. 1, 2013, pp. 1-220.
Exhibit D.3, Oracle Corporation's Invalidity Contentions, C.A. No. 11-825 (RGA), filed Mar. 1, 2013, pp. 1-89.

(56) References Cited

OTHER PUBLICATIONS

Exhibit D.4, Oracle Corporation's Invalidity Contentions, C.A. No. 11-825 (RGA), filed Mar. 1, 2013, pp. 1-68.
Exhibit D.5, Oracle Corporation's Invalidity Contentions, C.A. No. 11-825 (RGA), filed Mar. 1, 2013, pp. 1-42.
Exhibit D.6, Oracle Corporation's Invalidity Contentions, C.A. No. 11-825 (RGA), filed Mar. 1, 2013, pp. 1-46.
Exhibit D.7, Oracle Corporation's Invalidity Contentions, C.A. No. 11-825 (RGA), filed Mar. 1, 2013, pp. 1-19.
Exhibit D.8, Oracle Corporation's Invalidity Contentions, C.A. No. 11-825 (RGA), filed Mar. 1, 2013, pp. 1-14.
Connections Education LLC's Preliminary Invalidity Contentions, C.A. No. 1:11-CV-825-RGA, filed Mar. 1, 2013, pp. 1-18.
Exhibit A, Connections Education LLC's Preliminary Invalidity Contentions, C.A. No. 1:11-CV-825-RGA, filed Mar. 1, 2013, pp. 1-13.
Exhibit B, Connections Education LLC's Preliminary Invalidity Contentions, C.A. No. 1:11-CV-825-RGA, filed Mar. 1, 2013, pp. 1-13.
Exhibit C, Connections Education LLC's Preliminary Invalidity Contentions, C.A. No. 1:11-CV-825-RGA, filed Mar. 1, 2013, pp. 1-14.
Exhibit D, Connections Education LLC's Preliminary Invalidity Contentions, C.A. No. 1:11-CV-825-RGA, filed Mar. 1, 2013, pp. 1-9.
AICC Guidelines and Recommendations, White Papers, and Working Papers, documents taken from www.aicc.org through Dec. 21, 1998: AICC Guidelines and Recommendations, AGR-001, version 1.0, "AICC Publications," allegedly dated Oct. 1, 1994, 6 pages.
AICC Guidelines and Recommendations, AGR-002, version 7.0, "Courseware Delivery Stations: Hardware," allegedly dated Jan. 14, 1998, 5 pages.
AICC Guidelines and Recommendations, AGR-003, version 2.0, "Digital Audio," allegedly dated Jan. 9, 1997, 4 pages.
AICC Guidelines and Recommendations, AGR-004, version 4.0, "Courseware Delivery Stations: Software," allegedly dated Mar. 27, 1996, 6 pages.
AICC Guidelines and Recommendations, AGR-005, version 1.0, "CBT Peripheral Devices," allegedly dated Nov. 11, 1992, 4 pages.
AICC Guidelines and Recommendations, AGR-006, version 2.0, "Computer Managed Instruction," allegedly dated May 19, 1998, 5 pages.
AICC Guidelines and Recommendations, AGR-007, version 1.0, "Courseware Interchange," allegedly dated Aug. 29, 1995, 3 pages.
AICC Guidelines and Recommendations, AGR-008, version 1.0, "Digital Video," allegedly dated Aug. 29, 1995, 3 pages.
AICC Guidelines and Recommendations, AGR-009, version 1.0, "Icon Standards: User Interface," allegedly dated Jun. 13, 1996, 4 pages.
AICC Document, AUD001-A, "Plug & Play Guidelines for AICC CBT Drivers," allegedly dated Mar. 18, 1992, 23 pages.
AICC Document, AUD002/AUD002A/AUD002B (compiled), "Digital Audio Portability Guidelines AICC," allegedly dated May 3, 1998, 93 pages.
AICC Document, AUD003, "AICC Extensions to the IMA Recommended Practices," allegedly dated May 3, 1998, 20 pages.
AICC Document, CMI003, "AICC/CMI Certificate Testing Procedures Signature p.," version 1.0a, date unknown, 1 page.
AICC Document, CMI001, "CMI Guidelines for Interoperability AICC," allegedly dated Jun. 18, 1998, 310 pages.
AICC Document, CMI003, "AICC/CMI Certification Testing Procedures," allegedly dated Sep. 24, 1998, 118 pages.
AICC Document, CMI004, "AICC/CMI Assignable Unit (AU) Proxy Design Guidelines," allegedly dated Jun. 24, 1998, 15 pages.
AICC Document, CMI005, "Handling Objectives in the AICC CMI Guidelines," allegedly dated Jul. 6, 1998, 26 pages.
AICC Document, CMI006, "Levels of CMI Compliance Supplement to AICC CMI Guidelines," allegedly dated Jun. 24, 1998, 20 pages.
AICC Document, CM1007, "Web Launch Scenario for the AICC CMI Guidelines," allegedly dated Jul. 2, 1998, 15 pages.
AICC Document, COM002, "Documentation Guidelines for AICC non-AGR-Publications," allegedly dated Sep. 11, 1992, 54 pages.
AICC Document, CRS002, "Glossary of Terms Related to Computer-Based Training," allegedly dated Jan. 31, 1997, 125 pages.
AICC Document, CRS003, "Hierarchy of CBT Terms for AICC Publications," allegedly dated Dec. 17, 1992, 15 pages.
AICC Document, CRS004, "Guidelines for CBT Courseware Interchange," allegedly dated Oct. 31, 1995, 41 pages.
AICC Document, CRS005, "Bitmap Graphic File Format: An AICC White Paper," allegedly dated Jun. 17, 1998, 10 pages.
AICC Document, CRS006, "Distance Learning Technology for Aviation Training," allegedly dated Jun. 24, 1997, 48 pages.
AICC Document, ELS001, "Digital Electronic Library System: An AICC White Paper," allegedly dated May 4, 1998, 34 pages.
AICC Document, MPD005, "Part Task Trainer Interfacing," allegedly dated Jun. 17, 1994, 12 pages.
AICC Document, MPD006, "AICC Audio and the Migration to Windows: An AICC White Paper," allegedly dated Jun. 20, 1994, 6 pages.
AICC Document, MPD010/MPD004, "Simulation Interoperability," allegedly dated May 19, 1995, 113 pages.
AICC Document, MPD011, "The Use of Digital Video in Computer Based Training," allegedly dated Apr. 5, 1995, 30 pages.
AICC Document, "Draft AICC White Paper: CBT Design and Development Recommendations for Users of AICC CMI Systems," allegedly dated Jun. 17, 1998, 5 pages.
AICC Document (alleged) "Graphic Library Specification," version 1.01.0, allegedly dated Jan. 6, 1998, 15 pages.
AICC Document (alleged) "P_Code Specification," version 1.01.0, allegedly dated May 28, 1998, 13 pages.
AICC Document (alleged) "T_Code Specification," version 1.01.0, allegedly dated May 26, 1998, 9 pages.
AICC Document (alleged) "SMGGen Specifications," version 2.01, allegedly dated Dec., 22, 1998, 28 pages.
Hollingsworth, Gerald, Etude Version 2.0 User Guide, date unknown, 91 pages.
Etude™ 3.1 Requirements Analysis, date unknown, 96 pages.
Hollingsworth, Gerald T. "Etude® Methodology: The Process for Training Design, Qualification Maintenance and Employee Development," GPU Nuclear Training Services Group, © 1996 GPU Nuclear, GPU Corp., 22 pages.
Hollingsworth, Gerald T. "Etude™ Training Program Module I: (Introduction to Processes)," GPU Nuclear Training Services Group, allegedly dated 1997, 35 pages.
Hollingsworth, Gerald T. "Etude™ Training Program Module II: Scheduling Processes," © 1997 GPU Nuclear, Inc., 15 pages.
Hollingsworth, Gerald T. "Etude™ Training Program Module III: Employee Qualification Documentation," GPU Nuclear Training Services Group, allegedly dated 1997, 8 pages.
Hollingsworth, Gerald T. "Etude™ Training Program: Module IV: Training System Design Functions," GPU Nuclear Training Services Group, © 1997 GPU Nuclear, Inc., Cover Page And pp. 1-9.
Hollingsworth, Gerald T. "Etude™ Training Program: Module V: Evaluations and Exam Building," GPU Nuclear Services Group, allegedly dated 1997, Cover Page And pp. 1-5.
New Features for Ingenium 2.0, date unknown, 13 pages.
Ingenium 3.0 User's Guide, Meliora Systems, Inc. © 1993-1997 Meliora Systems, Inc., 413 pages.
Ingenium™ for Windows™ the Intelligent Training Management Software, Meliora Systems, Inc., allegedly dated Oct. 31, 1996, 1 page.
Ingenium™ for Windows™ Getting Started & Tutorial Guide, © 1995 Meliora Systems, Inc., 162 pages.
Ingenium Messenger™ 3.0 Manual, © 1997 Meliora Systems, Inc., 166 pages.
"Announcing Ingenium Messenger," Meliora Systems, Inc., allegedly dated Dec. 20, 1996, updated Sep. 10, 1997, 2 pages.
Ingenium™: Ingenium Reports Guide, © 1997 Meliora Systems, Inc., 105 pages.
System Administration Guide Ingenium 3.0, © 1993-1997 by Meliora Systems, Inc., 181 pages.

(56) References Cited

OTHER PUBLICATIONS

ACT, copyright allegedly dated 1995 (1 CD).
Kaplan, copyright allegedly dated 1995 (1 CD).
LOIS and LOIS Demo by KnowledgeSoft allegedly dated Jun. 26, 1997 (1 CD).
LOIS: Trade Show Attract Loop by KnowledgeSoft, allegedly dated Sep. 1996 (1 DVD).
Registrar, copyright date either unknown or allegedly dated no earlier than 2000 (1 DVD).
"CPSC 315 WebCT Tool Page," http://www.cs.ubc.ca/wccce/program97/murray/toolpage1.gif, date unknown, 1 pg.
CS Dept. NSF-Supported Education Infrastructure Project/ei.cs.vt. edu, Virginia Polytechnic Institute and State University, date unknown, 1 pg.
Edelson, D.C. et al., "Teachers as Seekers of Understanding: Technological Support for a Partnership between Teachers and Students," presented at AERA, New York, NY, 1996, 27 pgs.
Goldberg, M.W. et al. "An Update on WebCT (World-Wide-Web Course Tools) —A Tool for the Creation of Sophisticated Web-Based Learning Environments," Proceedings of NAUWeb'97 — Current Practices in Web-Based Course Development, Jun. 12-15, 1997, http://www.cs.ubc.ca/wccce/program97/murray/murray.html, 13 pgs.
Harasim, L., et al. *Learning Networks: A Field Guide to Teaching and Learning Online* © 1995 the MIT Press, Fifth printing 2001, 334 pgs.
Hollingsworth, Gerald, Etude Version 2.0 User Guide, allegedly dated Jun. 1997, 93 pgs.
Moore, J. et al. "Computer-Aided Instruction with Microcomputers: Part 1, Systems and applications," *Journal of Chemical Education*, v. 56, No. 12, Dec. 1979, 776-783.
PLATO User's Guide, Rev. C, ©1974, 1975, 1976, 1981 Control Data Corporation, 273 pgs.
Reakes, Dr. Michael, "Management of Integrated Training Systems," from Proceedings of the IEEE 1990 National Aerospace and Electronics Conference, pp. 924-928, May 21-25, 1990, IEEE Explore, © 2012, 6 pgs.
Tinoco, Lucio Cunha, "Online Evaluation in WWW-based Courseware: the QUIZIT System," MS Thesis, Virginia Polytechnic Institute and State University, Jan. 20, 1996, 87 pgs.
Part 1: Wenger, Etienne, *Artificial Intelligence and Tutoring Systems: Computational and Cognitive Approaches to the Communication of Knowledge*, ©1987 Morgan Kaufmann Publishers, Inc., 245 pgs.
Part 2: Wenger, Etienne, *Artificial Intelligence and Tutoring Systems: Computational and Cognitive Approaches to the Communication of Knowledge*, ©1987 Morgan Kaufmann Publishers, Inc., 260 pgs.
K12 Inc.'s First Supplemental Invalidity Contentions, C.A. No. 11-1026 (RGA), Apr. 5, 2013, pp. 1-24.
Exhibit A-1, K12 Inc.'s First Supplemental Invalidity Contentions, C.A. No. 11-1026 (RGA), Apr. 5, 2013, pp. 1-46.
Exhibit A-2, K12 Inc.'s First Supplemental Invalidity Contentions, C.A. No. 11-1026 (RGA), Apr. 5, 2013, pp. 1-50.
Exhibit A-3, K12 Inc.'s First Supplemental Invalidity Contentions, C.A. No. 11-1026 (RGA), Apr. 5, 2013, pp. 1-57.
Exhibit A-4, K12 Inc.'s First Supplemental Invalidity Contentions, C.A. No. 11-1026 (RGA), Apr. 5, 2013, pp. 1-99.
Exhibit A-5, K12 Inc.'s First Supplemental Invalidity Contentions, C.A. No. 11-1026 (RGA), Apr. 5, 2013, pp. 1-73.
Exhibit A-6, K12 Inc.'s First Supplemental Invalidity Contentions, C.A. No. 11-1026 (RGA), Apr. 5, 2013, pp. 1-19.
Exhibit A-7, K12 Inc.'s First Supplemental Invalidity Contentions, C.A. No. 11-1026 (RGA), Apr. 5, 2013, pp. 1-78.
Exhibit A-8, K12 Inc.'s First Supplemental Invalidity Contentions, C.A. No. 11-1026 (RGA), Apr. 5, 2013, pp. 1-28.
Exhibit A-9, K12 Inc.'s First Supplemental Invalidity Contentions, C.A. No. 11-1026 (RGA), Apr. 5, 2013, pp. 1-22.
Exhibit A-10, K12 Inc.'s First Supplemental Invalidity Contentions, C.A. No. 11-1026 (RGA), Apr. 5, 2013, pp. 1-71.
Exhibit A-11, K12 Inc.'s First Supplemental Invalidity Contentions, C.A. No. 11-1026 (RGA), Apr. 5, 2013, pp. 1-41.
Exhibit A-12, K12 Inc.'s First Supplemental Invalidity Contentions, C.A. No. 11-1026 (RGA), Apr. 5, 2013, pp. 1-266.
Exhibit A-13, K12 Inc.'s First Supplemental Invalidity Contentions, C.A. No. 11-1026 (RGA), Apr. 5, 2013, pp. 1-87.
Exhibit A-14, K12 Inc.'s First Supplemental Invalidity Contentions, C.A. No. 11-1026 (RGA), Apr. 5, 2013, pp. 1-50.
Exhibit A-15, K12 Inc.'s First Supplemental Invalidity Contentions, C.A. No. 11-1026 (RGA), Apr. 5, 2013, pp. 1-50.
Exhibit A-16, K12 Inc.'s First Supplemental Invalidity Contentions, C.A. No. 11-1026 (RGA), Apr. 5, 2013, pp. 1-26.
Exhibit A-17, K12 Inc.'s First Supplemental Invalidity Contentions, C.A. No. 11-1026 (RGA), Apr. 5, 2013, pp. 1-27.
Exhibit A-18, K12 Inc.'s First Supplemental Invalidity Contentions, C.A. No. 11-1026 (RGA), Apr. 5, 2013, pp. 1-42.
Exhibit A-19, K12 Inc.'s First Supplemental Invalidity Contentions, C.A. No. 11-1026 (RGA), Apr. 5, 2013, pp. 1-68.
Exhibit A-20, K12 Inc.'s First Supplemental Invalidity Contentions, C.A. No. 11-1026 (RGA), Apr. 5, 2013, pp. 1-44.
Exhibit A-21, K12 Inc.'s First Supplemental Invalidity Contentions, C.A. No. 11-1026 (RGA), Apr. 5, 2013, pp. 1-52.
Exhibit A-22, K12 Inc.'s First Supplemental Invalidity Contentions, C.A. No. 11-1026 (RGA), Apr. 5, 2013, pp. 1-27.
Exhibit A-23, K12 Inc.'s First Supplemental Invalidity Contentions, C.A. No. 11-1026 (RGA), Apr. 5, 2013, pp. 1-114.
Exhibit A-24, K12 Inc.'s First Supplemental Invalidity Contentions, C.A. No. 11-1026 (RGA), Apr. 5, 2013, pp. 1-64.
Exhibit A-25, K12 Inc.'s First Supplemental Invalidity Contentions, C.A. No. 11-1026 (RGA), Apr. 5, 2013, pp. 1-30.
Exhibit A-26, K12 Inc.'s First Supplemental Invalidity Contentions, C.A. No. 11-1026 (RGA), Apr. 5, 2013, pp. 1-91.
Exhibit A-27, K12 Inc.'s First Supplemental Invalidity Contentions, C.A. No. 11-1026 (RGA), Apr. 5, 2013, pp. 1-70.
Exhibit A-28, K12 Inc.'s First Supplemental Invalidity Contentions, C.A. No. 11-1026 (RGA), Apr. 5, 2013, pp. 1-87.
Exhibit A-29, K12 Inc.'s First Supplemental Invalidity Contentions, C.A. No. 11-1026 (RGA), Apr. 5, 2013, pp. 1-159.
Exhibit A-30, K12 Inc.'s First Supplemental Invalidity Contentions, C.A. No. 11-1026 (RGA), Apr. 5, 2013, pp. 1-86.
Exhibit A-31, K12 Inc.'s First Supplemental Invalidity Contentions, C.A. No. 11-1026 (RGA), Apr. 5, 2013, pp. 1-25.
Expert Report on Invalidity by Kris Jamsa, C.A. No. 11-876-RGA, dated Jul. 29, 2013, pp. 1-421.
Scardamalia, M., et al. "Computer-Supported Intentional Learning Environments," J. Educational Computing Research, vol. 5(1), 51-68, 1989, 16 pgs.
Ishii, Hiroshi. "TeamWorkStation: Towards a Seamless Shared Workspace," CSCW 90 Proceedings, Oct. 1990, pp. 13-26.
Steed, Colin. *Web-based Training*, © Colin Steed 1999, Gower Publishing Limited, Book Cover, Publication pages, Table of Contents and pp. 98-106.
Lotus LearningSpace Installation and Administration Guide, Release 2.5, ©1996, 1997, 1998 Lotus Development Corporation, Cover Page, Publication Page, Table of Contents and pp. 1-31, 33-43.
Merrill, M. D., et al. Excerpts from *The Instructional Design Library: TICCIT*, vol. 40, ©1980 Educational Technology Publications, Inc., 35 pages.
Brusilovsky, Peter. "Student model centered architecture for intelligent learning environments," In Proc. Of Fourth International Conference on User Modeling, Aug. 15-19, 1994, 10 pgs.
Shute, Valerie J. "SMART: Student Modeling Approach for Responsive Tutoring," User Modeling and User-Adapted Interactions, vol. 5, 1995, pp. 1-44 and back cover.
Schneck, Marjorie A. "Plato Implementations and Evaluations: New Behaviors and Objectives for Education," EdCompCon '84 Proceedings, University of Maryland, Nov. 8-10, 1984, Document Information Page and pp. 91-104.
Suppes, Patrick. "Chapter 17. Computer-based Mathematics Instruction," *The Computer In The School: Tutor, Tool, Tutee* Taylor, R., ed, ©1980 Teachers College, Columbia University, Cover Page, Publication Page and pp. 215-230.

(56) References Cited

OTHER PUBLICATIONS

Alessi, Stephen M. et al. "Chapter 3 Drills," *Computer-Based Instruction: Methods and Development*, 2nd edition, ©1991, 1985 Prentice-Hall, Inc., Cover Page, Publication Page and pp. 91-99, 102-117.

Harvett, Kathy, "The History of WebTycho", Achiever, the Alumni Magazine of University of Maryland University College, Spring 2003, Cover Page and pp. 14-17.

Exhibit A-32 of K12 Inc.'s Second Supplemental Invalidity Contentions, C.A. No. Nov. 1026 (RGA), dated Sep. 4, 2013, pp. 1-76.

Declaration of Fred Hofstetter, Blackboard Inc. vs. Desire2Learn Inc., Case No. 9:06 CV 155, dated Oct. 17, 2007, 3 pgs.

"History of Serf® Feature Development," www.serfsoft.com, 2 pgs.

Hofstetter, Fred T. "Three Waves of the Serf Web-based Teaching and Learning Environment," *Riding the Serf*, May 19, 1999, pp. 1-24.

Hofstetter, Fred T. "Serf® Administrator Guide," Version 1.0, Last Modified Nov. 12, 1997, ©1997 University of Delaware, pp. 1-30.

Hofstetter, Fred T. "Serf® Administrator Guide," Version 2.0, Last Modified Aug. 31, 1998, ©1998 University of Delaware, pp. 1-30.

Hofstetter, Fred T. "Serf® Administrator Guide," Version 3.0, Last Modified Feb. 28, 2000, ©1997-2000 Serfsoft Corporation, pp. 1-31.

Hofstetter, Fred T. "Serf® Instructor Guide," Version 1.0, Last Modified Nov. 12, 1997, ©1997 University of Delaware, pp. 1-30.

Hofstetter, Fred T. "Serf® Instructor Guide," Version 2.0, Last Modified Aug. 31, 1998, ©1998 University of Delaware, pp. 1-71.

Hofstetter, Fred T. "Serf® Instructor Guide," Version 3.0, Last Modified Feb. 28, 2000, ©1997-2000 Serfsoft Corporation, pp. 1-88.

Hofstetter, Fred T. "Serf® Student Jumpstart," Version 2.0, Last Modified Aug. 31, 1998, ©1998 University of Delaware, pp. 1-10.

Hofstetter, Fred T. "Serf's Up! Teaching and Learning with Serf, Your Servant on the Internet," Sep. 21, 1997, pp. 1-12.

Hofstetter, Fred T. "Serf® Sysadmin Guide," Version 1.0, Last Modified Nov. 12, 1997, ©1997 University of Delaware, pp. 1-17.

Hofstetter, Fred T. "Serf® Sysadmin Guide," Version 2.0, Last Modified Aug. 31, 1998, ©1998 University of Delaware, pp. 1-20.

Hofstetter, Fred T. "Serf® Sysadmin Guide," Version 3.0, Last Modified Feb. 28, 2000, ©1997-2000 Serfsoft Corporation, pp. 1-22.

Hofstetter, Fred T. "Serf® Teaching Assistant Guide," Version 1.0, Last Modified Nov. 12, 1997, ©1997 University of Delaware, pp. 1-12.

Hofstetter, Fred T. "Serf® Teaching Assistant Guide," Version 2.0, Last Modified Aug. 31, 1998, ©1998 University of Delaware, pp. 1-19.

Hofstetter, Fred T. "Serf® User Guide," Version 1.0, Last Modified Nov. 12, 1997, ©1997 University of Delaware, pp. 1-3.

Hofstetter, Fred T. "Serf® User Guide," Version 2.0, Last Modified Aug. 31, 1998, ©1998 University of Delaware, pp. 1-3.

Hofstetter, Fred T. "Serf® User Guide," Version 3.0, Last Modified Feb. 28, 2000, ©1997-2000 Serfsoft Corporation, pp. 1-3.

Oracle Corporation's Supplemental Invalidity Contentions, C.A. No. 11-825 (RGA), filed Oct. 4, 2013, pp. 1-34.

K12 Inc.'s Second Supplemental Invalidity Contentions, C.A. No. 11-1026 (RGA), dated Sep. 4, 2013, pp. 1-25.

K12 Inc.'s Third Supplemental Invalidity Contentions, C.A. No. 11-1026 (RGA), dated Oct. 16, 2013, pp. 1-25.

Exhibit A-33 of K12 Inc.'s Third Supplemental Invalidity Contentions, C.A. No. 11-1026 (RGA), Oct. 16, 2013, pp. 1-90.

Exhibit A-34 of K12 Inc.'s Third Supplemental Invalidity Contentions, C.A. No. 11-1026 (RGA), Oct. 16, 2013, pp. 1-21.

Exhibit A-35 of K12 Inc.'s Third Supplemental Invalidity Contentions, C.A. No. 11-1026 (RGA), Oct. 16, 2013, pp. 1-61.

Blease, Derek, *Evaluating Educational Software*, ©1986 Derek Blease, Croon Helm Ltd., 154 pages.

Squires, D., et al. *Choosing and Using Educational Software: A Teachers' Guide*, ©1994 D. Squires and A. McDougall, The Falmer Press, 175 pages.

Schank, R.C., et al. *Engines for Education*, © 1995 Lawrence Erlbaum Associates, Inc., 248 pages.

Highlights of the 1996 AERA Annual Meeting, Educational Researcher, v. 25, Jun. 1, 1996, http://edr.sagepub.com/content/25/5/16.citation, Publication Pages and pp. 16-17.

1996 AERA Annual Meeting Highlights New York, Apr. 8-12, Educational Researcher, v. 25, Jan. 1, 1996, http://edr.sagepub.com/content/25/1/37.citation, Publication Page and pp. 37-38.

Venezky et al., *The Intelligent Design of Computer-assisted instruction*, Chapter 9: Algorithms for student assessment: Formalizing instruction evaluation, Published by Longman, 1991, front and back cover, pp. 165-188.

*IpLearn LLC* v. *Blackboard Inc.*, Claim Construction Order, C.A. No. 1:11-00876-RGA, filed Feb. 19, 2014, pp. 1-4.

*IpLearn LLC* v. *K12 Inc.*, Claim Construction Order, C.A. No. 1:11-01026-RGA, filed Feb. 18, 2014, pp. 1-2.

*IpLearn, LLC* v. *Oracle Corporation et al.*, Claim Construction Order, C.A. No. 1:11-00825-RGA, filed Feb. 21, 2014, pp. 1-3.

Blackboard Inc.'s Initial Invalidity Contentions, C.A. No. 1:11-CV-876-RGA, filed May 29, 2012, pp. 1-37.

Blackboard Inc.'s Supplemental Initial Invalidity Contentions, C.A. No. 1:11-CV-876-RGA, filed May 6, 2013, pp. 1-49.

Exhibit C-1, Blackboard Inc.'s Initial Invalidity Contentions, C.A. No. 1:11-CV-876-RGA, filed May 29, 2012, pp. 1-46.

Exhibit C-2, Blackboard Inc.'s Initial Invalidity Contentions, C.A. No. 1:11-CV-876-RGA, filed May 29, 2012, pp. 1-88.

Exhibit C-3, Blackboard Inc.'s Initial Invalidity Contentions, C.A. No. 1:11-CV-876-RGA, filed May 29, 2012, pp. 1-75.

Exhibit C-4, Blackboard Inc.'s Initial Invalidity Contentions, C.A. No. 1:11-CV-876-RGA, filed May 29, 2012, pp. 1-88.

Exhibit C-5, Blackboard Inc.'s Initial Invalidity Contentions, C.A. No. 1:11-CV-876-RGA, filed May 29, 2012, pp. 1-33.

Exhibit C-6, Blackboard Inc.'s Supplemental Initial Invalidity Contentions, C.A. No. 1:11-CV-876-RGA, filed May 6, 2013, pp. 1-15.

Exhibit C-7, Blackboard Inc.'s Supplemental Initial Invalidity Contentions, C.A. No. 1:11-CV-876-RGA, filed May 6, 2013, pp. 1-15.

Exhibit C-8, Blackboard Inc.'s Supplemental Initial Invalidity Contentions, C.A. No. 1:11-CV-876-RGA, filed May 6, 2013, pp. 1-11.

Exhibit C-9, Blackboard Inc.'s Supplemental Initial Invalidity Contentions, C.A. No. 1:11-CV-876-RGA, filed May 6, 2013, pp. 1-14.

Exhibit C-10, Blackboard Inc.'s Supplemental Initial Invalidity Contentions, C.A. No. 1:11-CV-876-RGA, filed May 6, 2013, pp. 1-63.

Exhibit C-11, Blackboard Inc.'s Supplemental Initial Invalidity Contentions, C.A. No. 1:11-CV-876-RGA, filed May 6, 2013, pp. 1-116.

Exhibit C-12, Blackboard Inc.'s Supplemental Initial Invalidity Contentions, C.A. No. 1:11-CV-876-RGA, filed May 6, 2013, pp. 1-39.

Exhibit C-13, Blackboard Inc.'s Supplemental Initial Invalidity Contentions, C.A. No. 1:11-CV-876-RGA, filed May 6, 2013, pp. 1-24.

Exhibit C-14, Blackboard Inc.'s Supplemental Initial Invalidity Contentions, C.A. No. 1:11-CV-876-RGA, filed May 6, 2013, pp. 1-28.

Exhibit C-14, Blackboard Inc.'s Supplemental Initial Invalidity Contentions, C.A. No. 1:11-CV-876-RGA, filed May 6, 2013, pp. 1-54.

Exhibit C-16, Blackboard Inc.'s Supplemental Initial Invalidity Contentions, C.A. No. 1:11-CV-876-RGA, filed May 6, 2013, pp. 1-47.

Exhibit C-17, Blackboard Inc.'s Supplemental Initial Invalidity Contentions, C.A. No. 1:11-CV-876-RGA, filed May 6, 2013, pp. 1-29.

Exhibit D-1, Blackboard Inc.'s Initial Invalidity Contentions, C.A. No. 1:11-CV-876-RGA, filed May 29, 2012, pp. 1-15.

Exhibit D-2, Blackboard Inc.'s Initial Invalidity Contentions, C.A. No. 1:11-CV-876-RGA, filed May 29, 2012, pp. 1-30.

Exhibit D-3, Blackboard Inc.'s Initial Invalidity Contentions, C.A. No. 1:11-CV-876-RGA, filed May 29, 2012, pp. 1-28.

Exhibit D-4, Blackboard Inc.'s Initial Invalidity Contentions, C.A. No. 1:11-CV-876-RGA, filed May 29, 2012, pp. 1-33.

(56) References Cited

OTHER PUBLICATIONS

Exhibit D-5, Blackboard Inc.'s Initial Invalidity Contentions, C.A. No. 1:11-CV-876-RGA, filed May 29, 2012, pp. 1-11.
Exhibit E-1, Blackboard Inc.'s Initial Invalidity Contentions, C.A. No. 1:11-CV-876-RGA, filed May 29, 2012, pp. 1-37.
Exhibit E-2, Blackboard Inc.'s Initial Invalidity Contentions, C.A. No. 1:11-CV-876-RGA, filed May 29, 2012, pp. 1-87.
Exhibit E-3, Blackboard Inc.'s Initial Invalidity Contentions, C.A. No. 1:11-CV-876-RGA, filed May 29, 2012, pp. 1-85.
Exhibit E-4, Blackboard Inc.'s Initial Invalidity Contentions, C.A. No. 1:11-CV-876-RGA, filed May 29, 2012, pp. 1-90.
Exhibit E-5, Blackboard Inc.'s Initial Invalidity Contentions, C.A. No. 1:11-CV-876-RGA, filed May 29, 2012, pp. 1-28.
Exhibit H-1, Blackboard Inc.'s Initial Invalidity Contentions, C.A. No. 1:11-CV-876-RGA, filed May 29, 2012, pp. 1-19.
Exhibit H-2, Blackboard Inc.'s Initial Invalidity Contentions, C.A. No. 1:11-CV-876-RGA, filed May 29, 2012, pp. 1-22.
Exhibit H-3, Blackboard Inc.'s Initial Invalidity Contentions, C.A. No. 1:11-CV-876-RGA, filed May 29, 2012, pp. 1-19.
Exhibit H-4, Blackboard Inc.'s Initial Invalidity Contentions, C.A. No. 1:11-CV-876-RGA, filed May 29, 2012, pp. 1-29.
Exhibit B.5, Oracle Corporation's Supplemental Invalidity Contentions, C.A. No. 11-825 (RGA), filed Oct. 4, 2013, pp. 1-16.
Exhibit C.7, Oracle Corporation's Supplemental Invalidity Contentions, C.A. No. 11-825 (RGA), filed Oct. 4, 2013, pp. 1-44.
Exhibit D.9, Oracle Corporation's Supplemental Invalidity Contentions, C.A. No. 11-825 (RGA), filed Oct. 4, 2013, pp. 1-18.
Exhibit D.10, Oracle Corporation's Supplemental Invalidity Contentions, C.A. No. 11-825 (RGA), filed Oct. 4, 2013, pp. 1-21.
IpLearn's Motion for Summary Judgment, C.A. No. 11-876-RGA, filed Jul. 1, 2014, pp. 1-40.
Blackboards's Opening Brief in Support of Its Motion for Summary Judgment, C.A. No. 11-876 (RGA), filed Jul. 10, 2014, pp. 1-48.
Blackboard's Reply Brief in Further Support of Its Motion, C.A. No. 11/876 (RGA), filed Jul. 10, 2014, pp. 1-9.
Hubler, Alfred W., et al. "CyberProf: An Intelligent Human-Computer Interface for Asynchronous Widearea Training and Teaching," Paper Presented at the Fourth World Wide Web Conference, Dec. 12-13, 1995, Boston, MA.
K12 Inc.'s Fourth Supplemental Invalidity Contentions, C.A. No. 11-1026-RFA, filed Jan. 17, 2014, pp. 1-3.
*IpLearn LLC* v. *Blackboard Inc.*, Memorandum Order, C.A. No. 11-876-RGA, dated Aug. 26, 2014, pp. 1-3.
Blackboard Inc.'s Response to IpLearn's Motion for Summary Judgment, C.A. No. 11-876-RGA, filed Jul. 31, 2014, pp. 1-31.
IpLearn's Response to Blackboards's Motion for Summary Judgment, C.A. No. 11-876 (RGA), filed Jul. 31, 2014, pp. 1-39.
IpLearn's Reply in Support of its Motion for Summary Judgment, C.A. No. 11-876-RGA, filed Aug. 21, 2014, pp. 1-20.
Notice of Allowance for U.S. Appl. No. 09/273,392, dated Nov. 20, 2000.
Notice of Allowance for U.S. Appl. No. 09/273,392, dated Mar. 23, 2001.
Notice of Allowance for U.S. Appl. No. 09/273,392, dated Sep. 10, 2001.
Notice of Allowance for U.S. Appl. No. 09/273,392, dated Dec. 31, 2001.
Office Action for U.S. Appl. No. 90/006,915, re U.S. Pat. No. 6,398,556, dated Jun. 25, 2004.
Office Action for U.S. Appl. No. 90/006,915, re U.S. Pat. No. 6,398,556, dated Jul. 22, 2004.
Notification of Defective Paper for U.S. Appl. No. 90/006,915, re U.S. Pat. No. 6,398,556, dated Nov. 29, 2004.
Office Action for U.S. Appl. No. 90/006,915, re U.S. Pat. No. 6,398,556, dated Mar. 18, 2005.
Notice of Intent to Issue Reexam Certificate for U.S. Appl. No. 90/006,915, re U.S. Pat. No. 6,398,556, dated Jun. 25, 2004.
Decision Dismissing Petition in U.S. Appl. No. 90/006,915, re U.S. Pat. No. 6,398,556, dated Apr. 11, 2006.
Decision Regarding Information Disclosure Statement in U.S. Appl. No. 90/006,915, re U.S. Pat. No. 6,398,556, dated Dec. 18, 2006.
Restriction Requirement for U.S. Appl. No. 09/110,569, dated Jul. 20, 1999.
Office Action for U.S. Appl. No. 09/110,569, dated Oct. 6, 1991.
Notice of Allowance for U.S. Appl. No. 09/110,569, dated Jun. 19, 2000.
Notice of Allowance for U.S. Appl. No. 10/113,225, dated Feb. 28, 2003.
Notice of Allowance for U.S. Appl. No. 10/113,225, dated Jul. 15, 2003.
Notice of Allowance for U.S. Appl. No. 10/113,225, dated Sep. 29, 2003.
Notice of Allowance for U.S. Appl. No. 10/692,274, dated Jul. 7, 2004.
Notice of Allowance for U.S. Appl. No. 10/692,274, dated Feb. 10, 2005.
Notice of Allowance for U.S. Appl. No. 10/692,274, dated Dec. 27, 2005.
Notice of Allowance for U.S. Appl. No. 10/692,274, dated Jun. 30, 2006.
Notice of Allowance for U.S. Appl. No. 10/692,274, dated Sep. 27, 2006.
International Search Report for WO 00/02178 (PCT/US99/15251), dated Oct. 19, 1999.

\* cited by examiner

COMPUTER-AIDED METHODS AND APPARATUS TO ACCESS MATERIALS IN A NETWORK ENVIRONMENT

CROSS-REFERENCE TO RELATED APPLICATIONS

This is a continuation of and claims priority to U.S. patent application Ser. No. 10/692,274, filed on Oct. 22, 2003, now U.S. Pat No. 7,201,580 entitled "Inexpensive computer-aided learning methods and apparatus for learners," which application is a continuation of U.S. patent application Ser. No. 10/113,225, filed on Mar. 30, 2002, and subsequently issued on Feb. 3, 2004, as U.S. Pat. No. 6,685,478, entitled "Inexpensive computer-aided learning methods and apparatus for learners," which application is a continuation of U.S. patent application Ser. No. 09/290,770, filed on Apr. 13, 1999, and subsequently issued on Jun. 4, 2002, as U.S. Pat. No. 6,398,556, entitled "Inexpensive computer-aided learning methods and apparatus for learners", all incorporated by reference into this application.

BACKGROUND OF THE INVENTION

This invention relates generally to computer-aided learning methods and apparatus, and more particularly to inexpensive computer-aided learning methods and apparatus for learners.

We are living in the midst of tremendous technological changes. In the workplace, technology is replacing numerous workers. Many of our job skills might become obsolete within years. Though technology is permeating gradually into every stratum of the society, it is very hard to keep up with so much changes.

Not only is it hard to keep up, technology has made the world much smaller, and global competition much more intense. Not only facing global competition, we are also challenged by the younger generation. Many of them have access to computers and the Web at a very young age. They might be much more effective and efficient than the older generation in performing computer-oriented jobs.

Drastic and rapid changes in the economy lead to massive re-deployment of the labor force. Due to technology revolutions in the industrial nations, and social upheaval in many third-world countries, every year, thousands of job titles with their job functions are being eliminated. Numerous industries experience massive layoffs, which are usually more geared towards the older and higher-paid employees. This problem is exacerbated by the aging of the population when employers tend to retain the younger work force, with more current education. Many employees are in transition. They need jobs. Such global challenges are not limited to the private industries. Millions of civil service employees and military personnel have to be re-trained.

Employees have to learn. However, employees may not have time to learn. Computer-aided learning alleviates some of the problem because learning from a computer at least allows users to learn at their own pace and, to a certain degree, in a location more convenient to them. But, computer-aided learning is a new medium of learning, not accustomed to by many. To ask them to pay a high tuition to learn through a new medium is unreasonable. Moreover, many may not be accustomed to learn while working. They assume that they have finished with all of their learning at schools. Also, for the numerous employees-in-transition, they may not be interested to pay to learn at all.

From the employers' perspective, they need to stay competitive. Employers have to produce good products and services at reasonable prices. With competition from so many directions, employers have to constantly re-train their employees and recruit new ones. It is also not uncommon for employers to lay off some of them.

It is a constant challenge for employers to decide whom to hire. Just as employees need to learn about new job skills, employers need to learn about the strengths, weaknesses and preferences of their employees or potential employees.

It should be apparent that there is a need to automatically provide appropriate learning materials in an inexpensive and easily accessible manner to employees, while providing information about potential employees to employers.

SUMMARY OF THE INVENTION

The present invention provides computer-aided learning methods and apparatus that encourage employees to learn appropriate learning materials by providing them in an inexpensive and easily accessible manner, while allow employers to access information on potential employees.

A computer-aided learning system can provide users with learning materials in an easily accessible manner, significantly increasing their freedom to choose when and where to learn. The learning materials can also be quickly updated. In view of the drastic technological and societal changes, it is imperative that learning materials have to constantly keep pace with the changes.

On the other hand, learning through a computer has at least one major challenge. It is a relatively new approach to learning. Since many assume that they have done with all of their learning at schools, and are skeptical to anything that is not traditional, they are not interested in paying a lot of money to learn from a computer.

Though many do not want to pay a lot to learn from computers, computer-aided learning materials are not cheap to produce. It is difficult to prepare good computer-aided learning materials that not only can capture our attention, but also teach effectively. Companies that have invested heavily in producing these materials are not about to sell them inexpensively. They need to recoup their investment.

Drastic technological and society changes require companies to transform themselves to stay competitive. They need to find people to do new jobs. Hiring the right employee is a critical success factor for many employers. Many companies are willing to pay at least 20% of the first annual income of their new hires to recruiters because recruiters save them time in finding and pre-screening candidates. Also, good recruiters know their candidates, and are able to provide companies with valuable information on them. Typically, companies have a better chance of making the right hiring decision if they have more information on a candidate.

New computer-aided learning systems and methods can provide a lot of learning information regarding a user, as taught in a number of issued patents, such as Learning System And Method Based on Review, U.S. Pat. No. 5,863,208; Methods and Apparatus To Assess And Enhance A Student's Understanding In A Subject, U.S. Pat. No. 5,779,486; Relationship-Based Computer-Aided Educational System, U.S. Pat. No. 5,727,951; Reward Enriched Learning System And Method, U.S. Pat. No. 5,743,746; and Learning Method And System Based on Questioning, U.S. Pat. No. 5,836,771.

Information on users' learning activities is very useful for employers because they provide indication on many factors, including what the users know and their preferences. Many companies are willing to pay for such information.

In view of the above observations and insights, the invented methods and apparatus provide inexpensive computer-aided learning materials to users to work on. Such users can be known as learning users. Though the materials can be of high quality and can be specifically tailored to the needs of the users, the learning users do not have to pay much to learn from the materials. The costs of the learning materials and the services providing them are predominantly paid for by employers or institute users.

In return, the present invention allows institute users to access information regarding the learning users. The information can help institute users recruit the right people for their job openings, such as based on information from the learning activities of potential employees.

In one embodiment, there are at least two types of users: Learning users and institute users. An institute user can be a representative from a company, or can be a software agent from the company. An apparatus is configured to retrieve a user identifier entered by a user, and determine the type of user based on the identifier.

If the user is a learning user, the apparatus allows the user to access information regarding learning materials. The apparatus can track the user's learning activities and update the user's profile accordingly.

If the user is an institute user, the apparatus allows the user to access information regarding at least one learning user. As the institute user is querying information, the apparatus can track the institute user's activities and keep a log of its use. If the institute user is interested in recruiting, the apparatus may automatically perform the best match between attributes of the potential candidate for the job and attributes of the users in its database. In yet another embodiment, the institute user may also use the present invention to conduct in-house training for its employees.

To encourage learning users to learn, they do not have to pay much to learn. If possible, money should not be a factor that deters users to learn from the apparatus. On the other hand, institute users have to pay significantly more than the learning users to access information from the apparatus. In one embodiment, it is free for the learning users to access information regarding learning materials, but institute users have to pay to access information regarding learning users from the apparatus.

Other aspects and advantages of the present invention will become apparent from the following detailed description, which, when taken in conjunction with the accompanying drawings, illustrates by way of example the principles of the invention.

Same numerals in FIGS. 1-7 are assigned to similar elements in all the figures. Embodiments of the invention are discussed below with reference to FIGS. 1-7. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
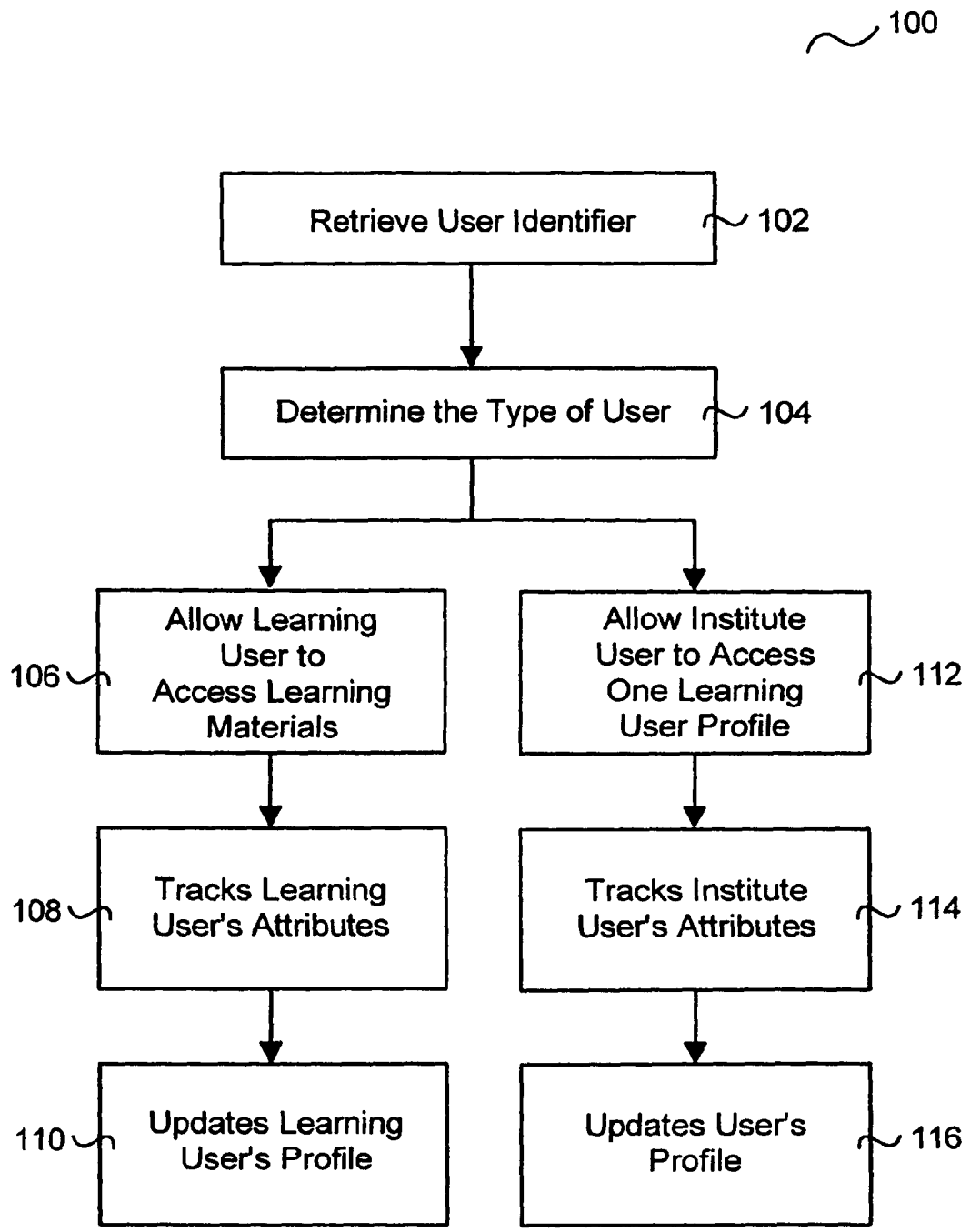
FIG. 1 shows one set of steps to implement one embodiment of the present invention.
Figure 2:
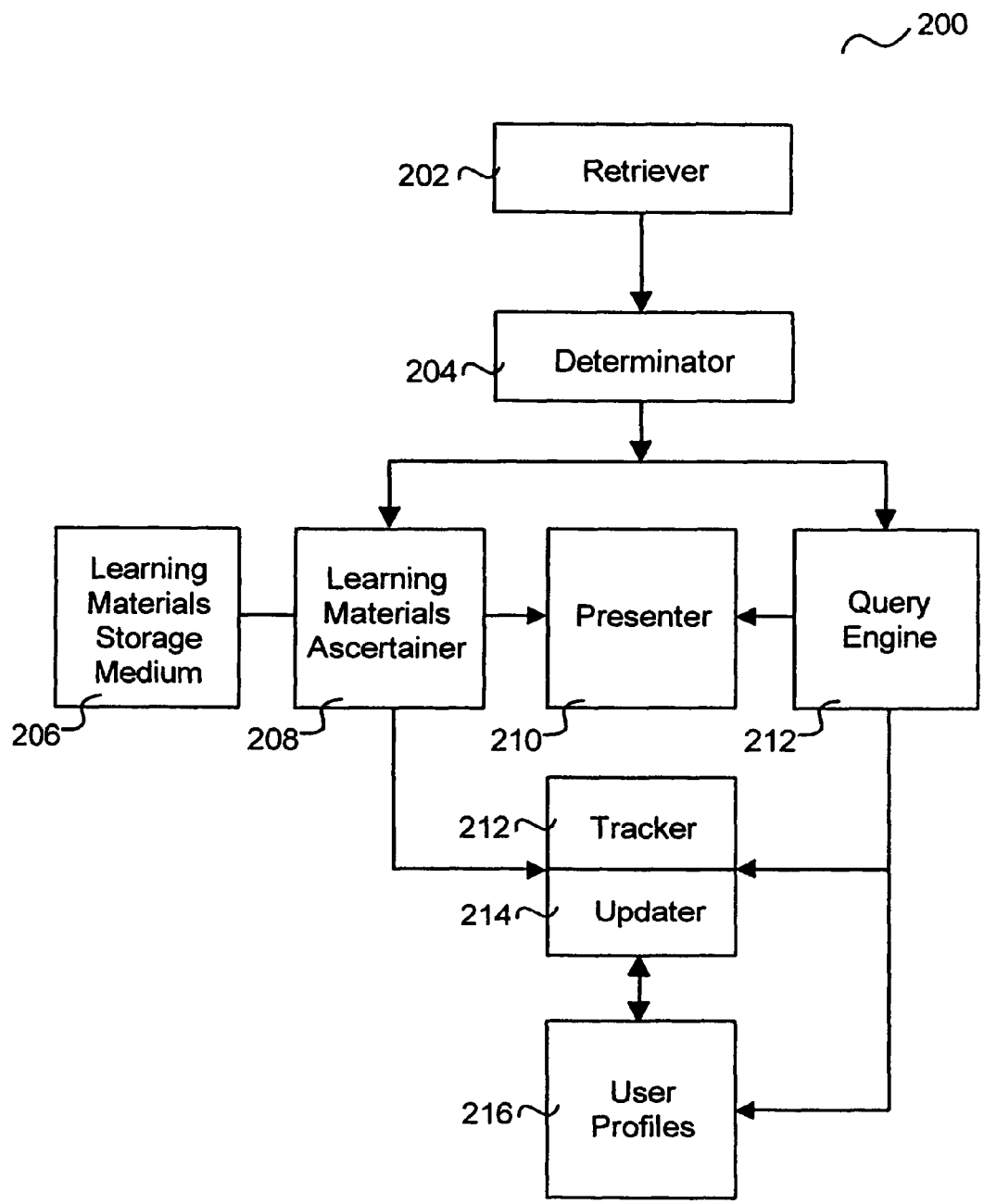
FIG. 2 shows an apparatus to implement one embodiment of the present invention.
Figure 3:
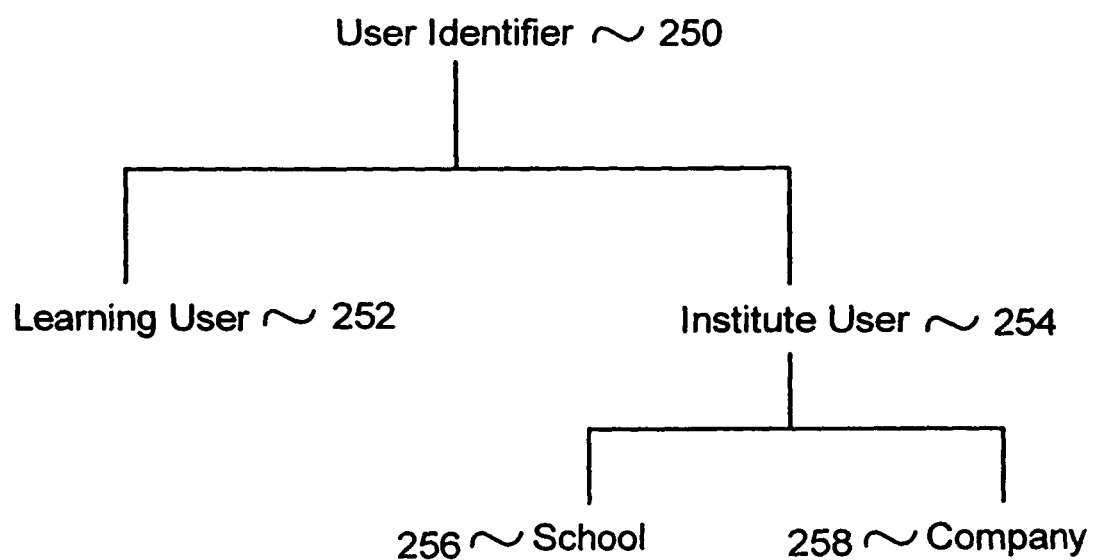
FIG. 3 shows examples of different types of users for the present invention.

There are a number of ways to implement the present invention. FIG. 1 shows one set of steps, 100, to implement one such embodiment by, for example, an apparatus shown in FIG. 2, while FIG. 3 shows examples of different types of users using the apparatus. There can be other types of users, such as system administrators, but only two are shown in FIG. 3.

In one embodiment, there are at least two types of users: Those who are primarily interested to use the apparatus 200 to work on learning materials, and they are known as the learning users, 252; and those who are primarily interested in learning about the learning users, and they are known as the institute user, 254. In another embodiment, if the user is primarily interested in finding a job or in career counseling, the user would be classified as a learning user. In yet another embodiment, a learning user is not allowed to access the learning activities of other learning users through the apparatus. In one embodiment, a learning user is not allowed to access the learning end results of other learning users through the apparatus. Learning end results can be defined as the end results of learning a subject matter, such as the grade one gets after finishing a course, or whether one has received a certificate or graduated from a course.

An institute user, 254, can be a school, 256, or a company, 258; or a representative from a school or a company. Each user has its own user identification, which can be a number that identifies the user.

A retriever 202 retrieves (Step 102) the user identifier 250 entered by the user into the apparatus. In one embodiment, the user is a first time user, and the apparatus 200 asks the user a number of questions. Based on the answers, the apparatus creates a user profile of the user, which contains information regarding the user.

Initially, for example, the user may be asked if he is a primarily interested to work on learning materials. If his answer is yes, he would be classified as a learning user. If his answer is no, he would be classified as an institute user.

Figure 4:
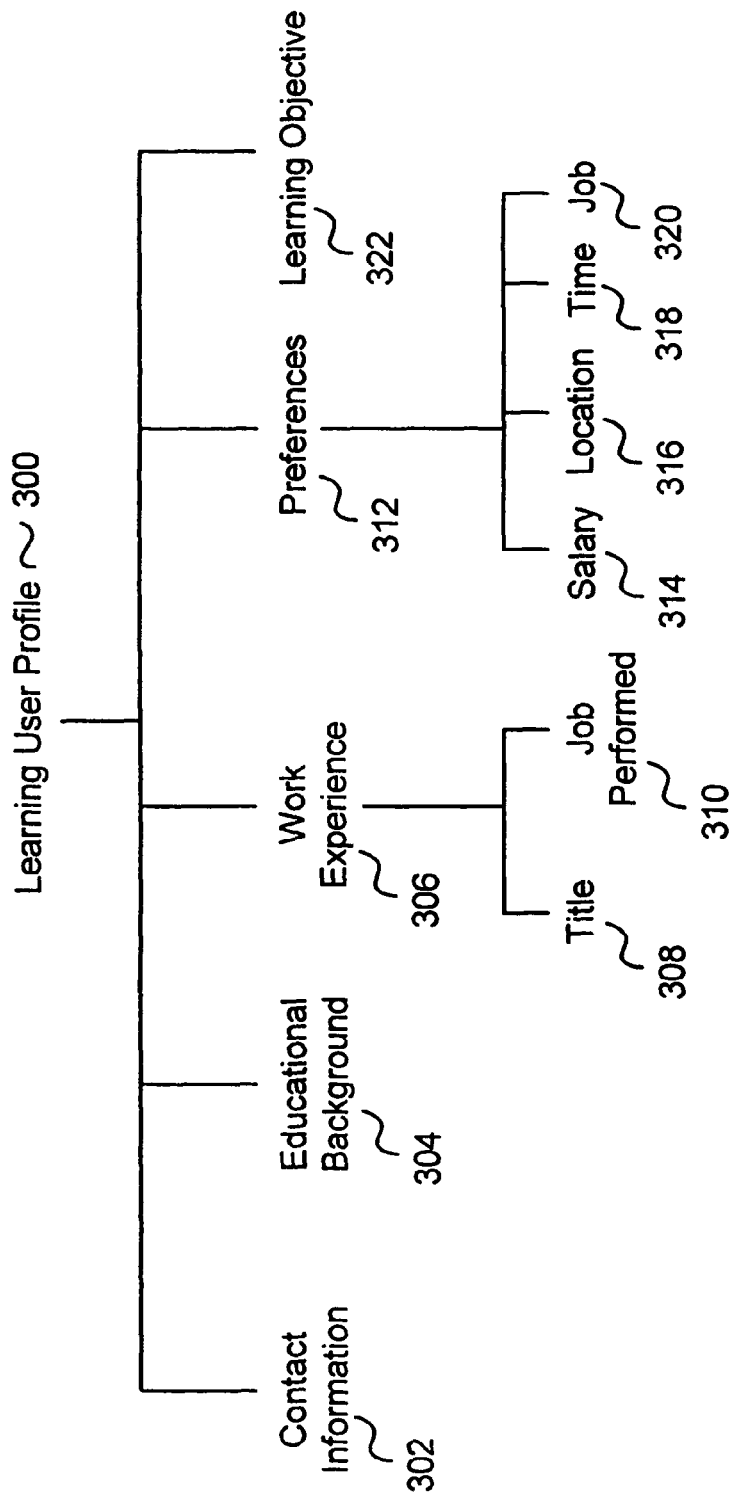
FIG. 4 shows examples of attributes of the learning user in the present invention.

FIG. 4 shows examples of information or attributes regarding a learning user, 300. One attribute is his contact information, 302, such as his residential address, phone number and email address.

Another attribute is his educational background 304, including his year(s) of graduation, degree(s) obtained and name(s) of school(s). The educational background can also include his previous learning history, such as classes he took, when he took them and whether he received graduation certificates or not.

Another attribute is his work experience 306, including his previous job title(s), 308, and previous job(s) performed, 310, such as the type of projects, and when they were done. Such questions can be presented as multiple choice questions for the user to pick an answer.

Another attribute can be his preferences, 312, including salary, 314, location, 316, time, 318, and job 320. The location preference includes his preferred work location, such as working two days from home, and three days at a location within a 50 miles radius from home. The location preference can also include his preferred learning location. The time preference includes his preferred work hours, such as from 9 am to 5 pm, or willingness to work overtime every other workday during the workweek. The time preference, 318, can also include his preferred learning time, such as at night after 6. The job preference, 320, includes the type of job he is interested in, such as to be a Web master.

Another attribute can be his learning objective, 322, including what he wants to learn. The learning objective, 322, can be determined for him, based on, for example, his job preference, educational background and previous work experience. This will be further explained below.

Other additional attributes include his name. The user may be asked to scan in his picture, which can be a JPEG file.

It can be up to the user to decide if he wants to enter some of the above information, such as his picture, into his user profile. Also, certain information in his profile can be kept confidential if the user desires. For example, the apparatus can maintain his contact information confidential, restricting institute users from gaining access, unless permitted by the learning user otherwise.

In one embodiment, information about the learning user can be categorized as confidential and non-confidential. Institute users have access to non-confidential information, but confidential information is not accessible without express consent from the learning user. When the learning user is entering information into the apparatus, he can also designate them as confidential or non-confidential.

In another embodiment, the user is not a first time user. He enters his user identifier into the apparatus. The retriever 202 retrieves the user identifier entered for a determinator 204 to determine (Step 104) its type. In this example, the user is a learning user, 252, and is allowed (Step 106) access to learning materials. The learning materials can be in a learning materials storage medium, 206, which may be accessible through a network, such as the World Wide Web.

In one embodiment, a learning material ascertainer, 208, ascertains learning materials for the learning user, 252. The ascertainer can ascertain a learning objective for the user, which depends on information regarding the user.

The ascertainer can identify the objective or learning materials based on applying a set of rules to, for example, the user's educational background, work experience and preferences. The user's work experience provides indications on his experience and knowledge in specific areas. As an example, if he spends a lot of time on a project, the ascertainer infers that he understands the project, and the subject areas behind the project. This implies that he does not need to work on introductory materials in those areas. To illustrate, the ascertainer can consider the amount of time to train an average user with similar educational background as the user for a job the user prefers. If a recent computer science graduate needs to take a two-semester class to become an average Java programmer, and if the user has been working on C++ projects for the past five years, the ascertainer would decide that he only needs to take a one-semester class with less introductory materials to become an average Java programmer. Another example is that the preferred job is to be a patent paralegal. The user has been a general paralegal for the last six years, but does not understand the procedures of patent prosecution. Then the learning objective would be to learn such procedures in the next nine months.

Based on the ascertained learning objective, the ascertainer could also select for the user, or guide the user to, learning materials to prepare the user for the job position. For example, the objective is to learn how to speak introductory Spanish in six months. The ascertainer can then select the place and the time to learn, or can identify the computer-based training classes available for her to learn. The identification process can be based on key words. As another example, the learning objective is to learn how to write fictions. Then, the ascertainer, based on words such as write and fictions, searches the learning material storage medium or other resources for learning materials whose titles have the same two key words.

In one embodiment, the ascertainer directly identifies learning materials for the user, without first identifying his learning objective.

One embodiment includes a presenter, 210, for presenting the ascertained learning materials to the user.

The learning user's information, including his usage of the apparatus, 200, can be tracked by the apparatus, 200. One embodiment includes a tracker 212 to track the user's information or attributes (Step 108), and an updater 214 to update (Step 110) the user's profile, such as his learning profile, based on the tracked information. In one embodiment, tracking includes analyzing, and the tracked information includes analyzed information.

Figure 5:
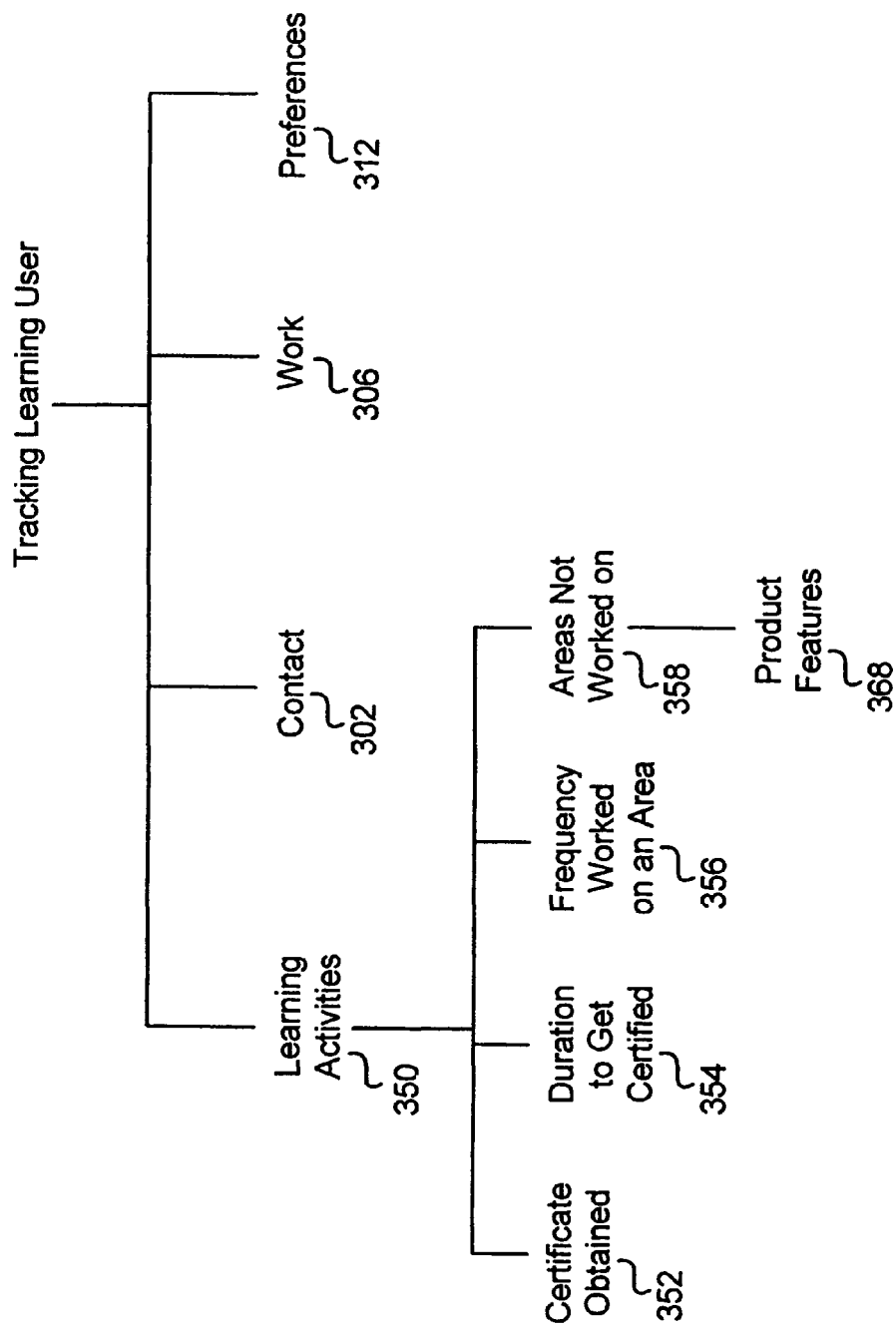
FIG. 5 shows examples of tracking attributes of the learning user in the present invention.

FIG. 5 shows examples of attributes or information regarding the user that the tracker 212 can track. They include the user's contact information, 302, work experience, 306, and preferences 312. As the user logs into the apparatus, 200, the apparatus can ask the user if he has recently changed anyone of the above attributes to keep track of his progress and interests. If he has, the updater 214 can update the user profiles accordingly. In one embodiment, the user can access and change his profile directly.

The tracker can also track the user's learning activities, 350. This can include the classes he has received certificates from after graduation, 352; the degree he received; the duration of time it took him to get the certification or the degree, 354; and his performance, if available. The learning activities can also include the frequencies he worked on an area, 356.

Rules can be applied to such tracked information to provide additional information regarding the user, such as indication as to the user's understanding level in an area. For example, if an average user takes one month to finish the course, and he needs a much longer time period, such as three months, probably, he is weak in that subject. Another example is that if he works on an area repeatedly, probably, he is quite weak in that area.

The learning activities can also include the areas, 358, he has not worked on. For example, he is using the apparatus to learn features in a new product, 368, of a company. It turns out that he has never worked one specific feature the company believes customers really value. This might provide indication to the company as to the importance of that feature.

The information tracked, either by themselves or after analysis, can be provided to the updater 214 to update information regarding the user, such as updating his profile previously stored. For example, he has received a certificate from a company after he finished the training program offered by the company on its new product. His user profile can be updated by such information. As another example, if the analyzed result is that he is strong in fixing engines, such information is stored in his user profile. In one embodiment, with his permission, institute users are allowed access to such information.

The tracking and updating processes can be for billing and accounting purposes. What is accountable can include, for example, the amount of time spent on the apparatus. Based on the tracked and updated information, records can be generated to create invoices for the learning user.

The user can be an institute user, 254. The determinator 204 can allow the user to access information regarding at least one learning user (Step 112), such as using a query engine, 212, to query information regarding the at least one learning user. The institute user can also query her own profile.

Figure 6:
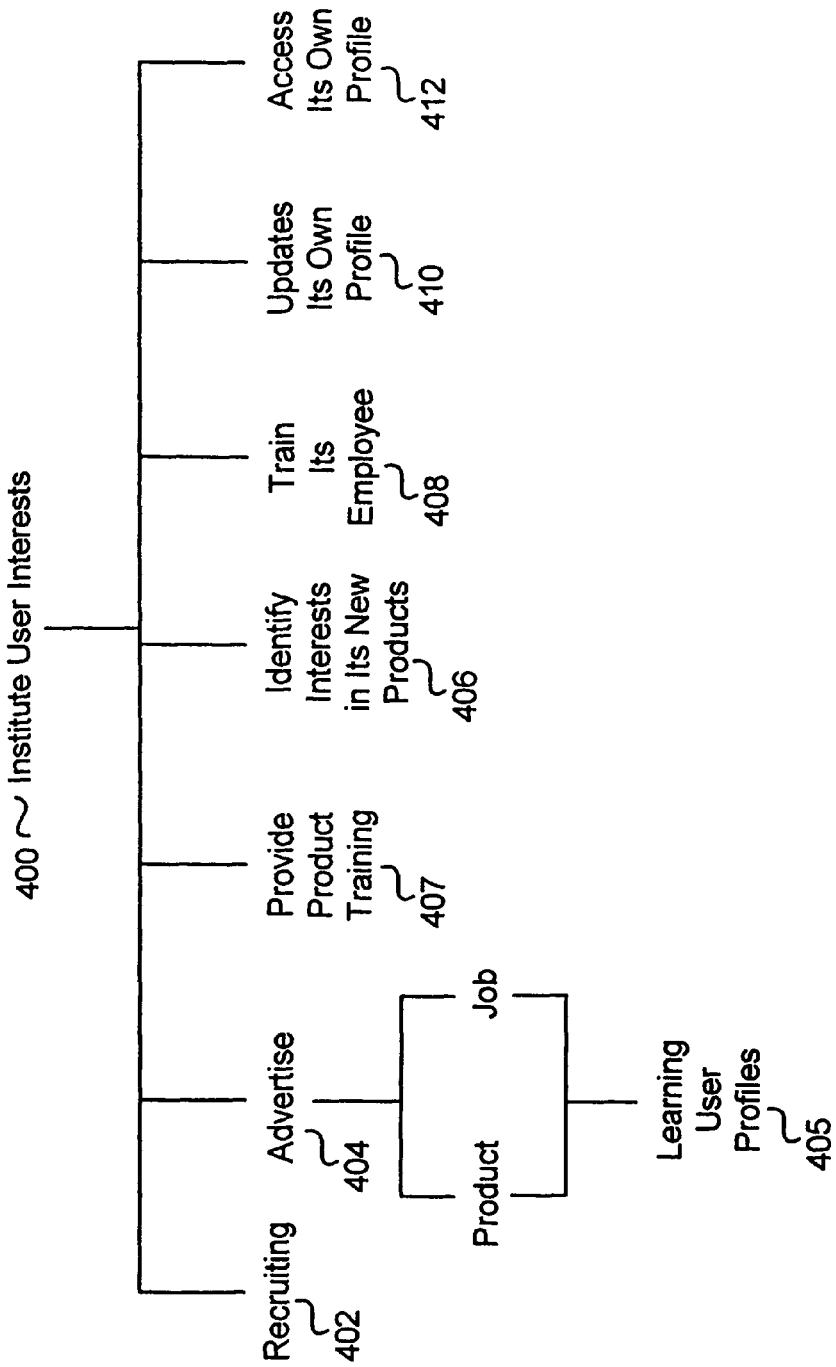
FIG. 6 shows examples of interests of the institute users in the present invention.

FIG. 6 shows examples of interests, 400, of the institute user. The tracker 212 can track (Step 114) her attributes, including her usage of the apparatus; and an updater, 214, can update (Step 116) her profile, 216, if necessary.

She might be interested in recruiting, 402, candidates to join her institute. She can query users' profiles to access information regarding learning users. Information of interests can include some of his learning activities, such as the certificate received after working on a subject matter; the frequency a candidate changed jobs; his job preferences; his previous work experience; and his physical location.

In one embodiment, the institute user can access at least some learning activities of learning users. The extent of activities the institute user can access can be up to individual learning users. For example, one learning user may allow the institute user free access of all of its learning activities; and another learning user may restrict the institute user from accessing the titles of the courses he failed.

The institute user can query the system, by asking questions. Methods for a system to comprehend and to answer questions can be found, for example, in U.S. Patent, entitled, Learning Method And System Based on Questioning, U.S. Pat. No. 5,836,771.

In another embodiment, she can answer multiple choice questions from the apparatus to formulate her request. She can specify characteristics of her ideal candidate. Based on her specifications, the query engine 212 can automatically search and identify the one or more candidates with best-matched profiles with the characteristics of the ideal candidate. In another embodiment, based on her answers, software agents configured by her or the query engine, can be generated to search the user profile database automatically for a number candidates that best match her requests. The agents or searches can be automatically activated due to changes in information of the institute user, or changes in information of certain learning users. Criteria of searches can be automatically updated in view of such changes before the query engine automatically launches the appropriate search. For example, the institute user might have to find two such candidates instead of one. Such updates and searches can be done daily or weekly.

The apparatus can further establish contact between the institute user and the one or more candidates identified. For example, initially, the candidates identified by the searches do not have to include their name, but just their qualifications. In one embodiment, if the institute user is interested in one or more of the candidates identified, she can highlight those candidates. The apparatus would have general information regarding the position transmitted to the candidates. An interested candidate can have his identity revealed to the institute user, again through the apparatus. With the candidate's permission, his picture can also be transmitted to the institute user. Then the apparatus can have the institute user's identity with a more detailed description of the job position transmitted to the candidate, and can set up an initial interview for the candidate.

The tracker 212 can track a number of the institute user's recruiting activities, such as (i) the number of candidates she identified to be potential candidates, (ii) the number of candidates referred to her, and (iii) the number of queries she did, and the time she did each of them. The updater 214 can update her profile based on the tracked information. This can be for setting up billing and accounting records. Such records can be used to create invoices for the institute user.

The institute user might be interested in advertising, 404, her job opening to be filled, or her product, which can be a service. The apparatus includes an advertisement generator, which allows her to advertise. In one embodiment, the generator formats the advertisement provided by the user, based on instructions from the user. For example, the user might specify the size of the advertisement, and its location. The advertisement can be targeted directly to specific users, 405, interested in her institute, such as interested in her products, or her type of jobs. This can be done, for example, by showing the advertisement on the screen of the learning materials related to the institute, such as related to the products or the type of jobs. In one embodiment, the advertisement is only presented to learning users. In another embodiment, the advertisement can be restricted from being presented to other institute users that sell products similar to the institute user, or are in the same field or industry sector as the institute user. As an example, the institute user is in home construction, and her advertisement of recruiting construction workers will not be presented to other home construction institute users.

The tracker 212 can track the size of the advertisement, the location the advertisement to be placed, the number of advertisements posted, and the duration of the postings. The tracker can also track the number of times the page with her advertisement has been accessed. The updater can update information of the institute user based on the tracked information. Then, the information regarding learning users the institute can access includes the number of times her advertisement has been shown to learning users.

She might want to use the apparatus as technical supports for her products, by providing appropriate training, 407, for them. She might also want to identify interests, 406, in her new products. In one embodiment, she can provide learning materials regarding her new products to the apparatus for users to learn. For example, her new product is a handheld machine. Learning users can use the apparatus to learn how to use the many features of the machine. The tracker tracks the usage of the learning users. The institute user has built into the machine a feature X and a feature Y that typical users have to learn before they know how to use them. The institute user thinks that feature X is dynamic, and none of their competitors have such a feature; and feature Y should be quite easy to use. However, less than 1% of the users have learnt how to use feature X. Also, 90% of learning users have difficulties learning how to use feature Y, as shown, for example, by the same learning users going back to learn feature Y more than three times. Such information regarding learning users can be tracked to provide market information on (learning users' interests in) the machine back to the institute user. The institute user can use such market information to help them improve on their next release. For example, probably for the next generation handheld machine, feature X should be dropped, and the user-friendliness aspect of feature Y should be enhanced. One way to feed the learning users' interests back to the institute user is by updating the institute user profile with such information.

Her interest might be to train her employees, 408, such as by providing in-house training for them. She can also get training herself through accessing learning materials. For example, she is a project supervisor using the apparatus to learn new techniques in HDSL installation, and to hire a person for ISDN installation. In one embodiment, she can be both an institute user and a learning user by having two different user identifiers.

She might be interested in updating her information or profile, 410, or accessing them, 412. The tracker can track the number of times she accessed or updated her profile, and the updater can update such user information accordingly.

To encourage learning users to work on learning materials, in one embodiment, they pay significantly less than institute users to access information from the apparatus. For example, institute users pay much more to query information from the apparatus than learning users to access learning materials from the apparatus. In one embodiment, learning users are paying significantly less when the annual payment or annual subscription fee of a learning user is less than 1/500 times of that of an institute user.

In another embodiment, a learning user is paying significantly less when it is free for the learning user to access information from the apparatus, while the institute user has to pay. The learning user does not have to pay the owner of the apparatus 200 or the provider of the method, 100, to access information, but the institute user has to.

In yet another embodiment, a learning user is paying significantly less when the learning user is paying approximately the per capita cost of operating the apparatus, and the institute user is paying above the per capita cost of operating the apparatus. One definition of per capita cost is the total expense of operating the apparatus divided by the total number of learning and institute users of the apparatus.

In one embodiment, a learning user is paying significantly less when the learning user is paying below the per capita cost of operating the apparatus, and the institute user is paying above the per capita cost of operating the apparatus.

Figure 7A:
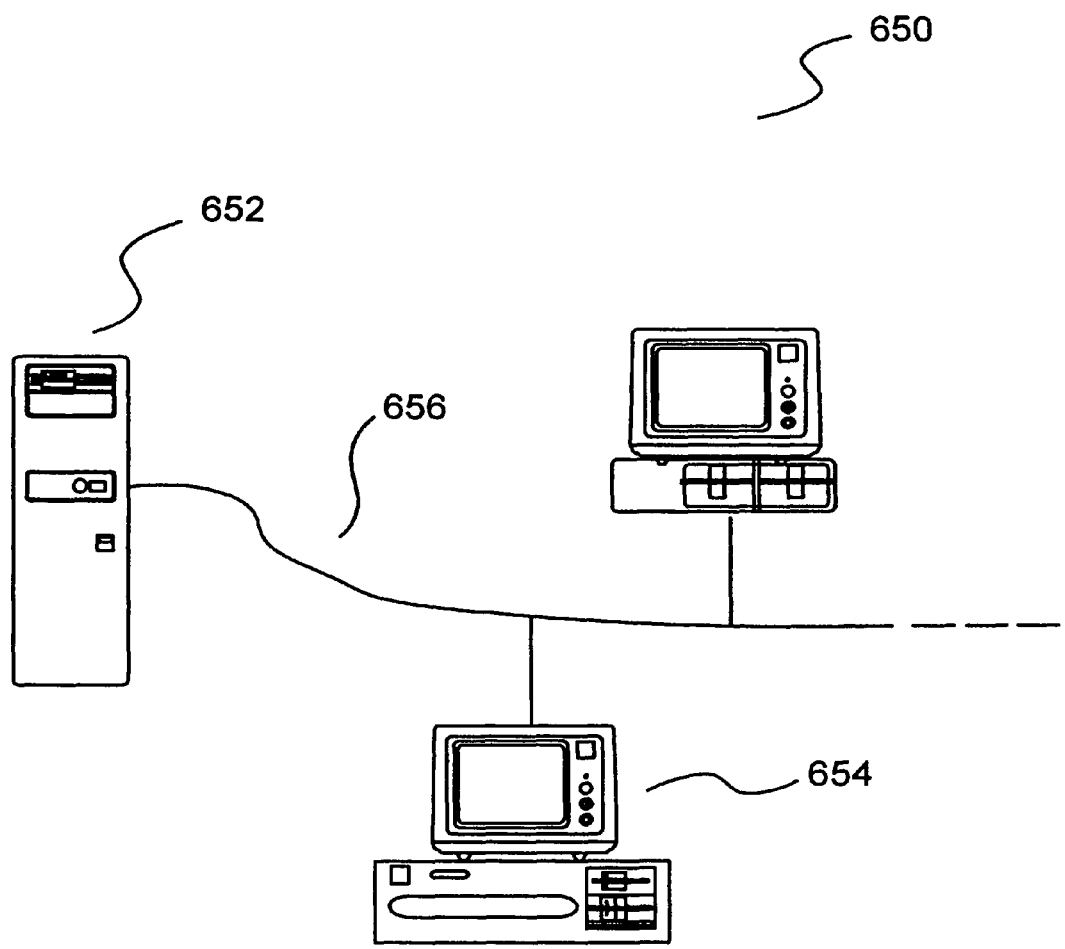
FIGS. 7 A-B show examples of hardware to implement one embodiment of the present invention.
Figure 7B:
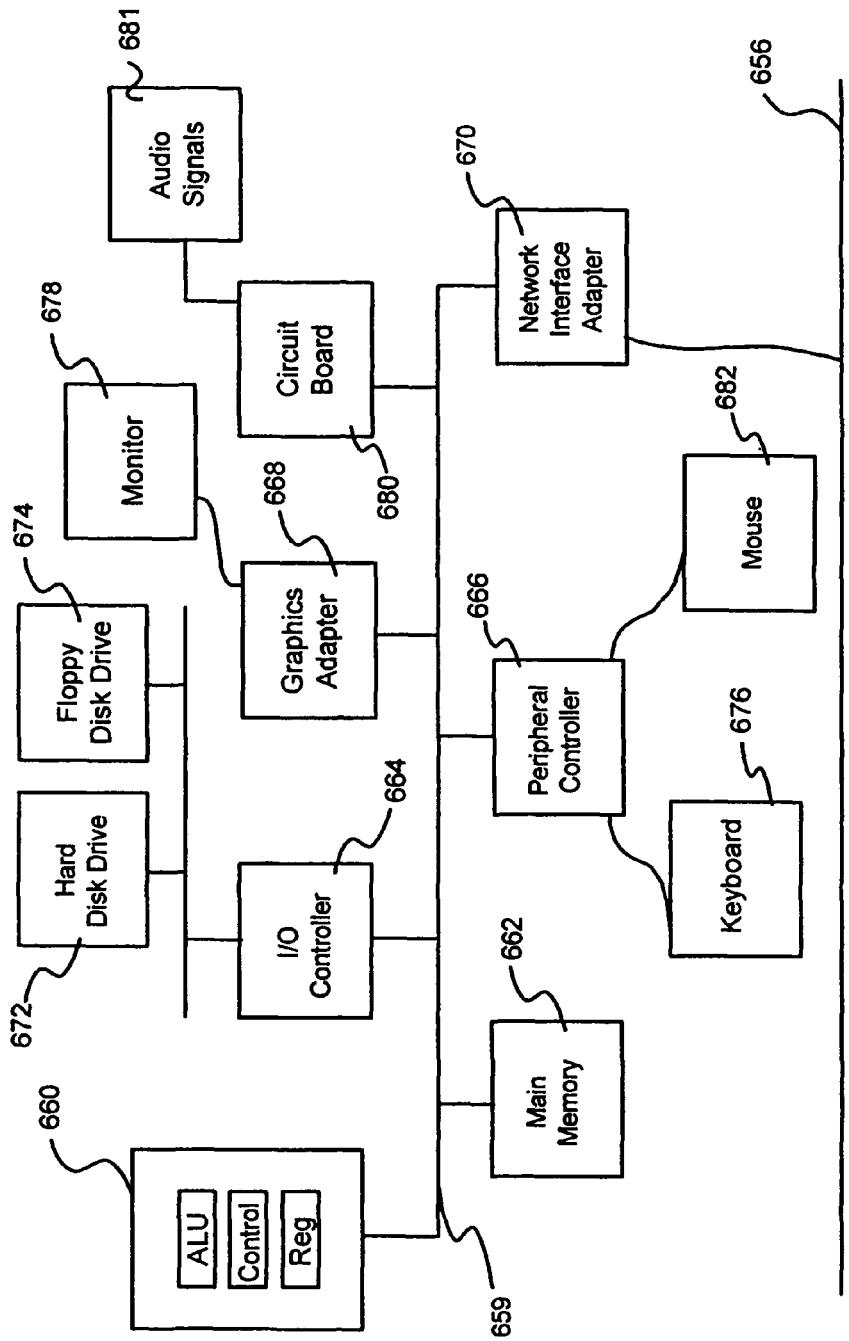

FIGS. 7A-B show examples of hardware to implement one embodiment of the present invention. FIG. 7A shows one physical embodiment 650 implementing one embodiment of the invention, preferably in software and hardware. The embodiment 650 includes a server computer 652 and a number of client computers, such as 654, which can be a personal computer. Each client computer communicates to the server computer 652 through a dedicated communication link, or a computer network 656.

FIG. 7B shows one embodiment of a client computer 654. It typically includes a bus 659 connecting a number of components, such as a processing unit 660, a main memory 662, an I/O controller 664, a peripheral controller 666, a graphics adapter 668, a circuit board 680 and a network interface adapter 670. The I/O controller 664 is connected to components, such as a harddisk drive 672 or a floppy disk drive 674. The peripheral controller 666 can be connected to one or more peripheral components, such as a keyboard 676 or a pointing device 682. The graphics adapter 668 can be connected to a monitor 678. The circuit board 680 can be coupled to audio signals 681; and the network interface adapter 670 can be connected to the network 656, which can be the Internet, an intranet, the Web or other forms of networks. The processing unit 660 can be an application specific chip. In another embodiment, the client computer 654 is a thin-client, with much less computation and memory power than the server computer, 652.

Different elements in the present invention may be in different physical components. For example, the apparatus may be in a client computer. In another embodiment, the apparatus is in a client computer, except the learning materials storage medium, which is in a server computer. In yet another embodiment, the server computer also hosts a storage medium with the user profiles, 216. In one embodiment, the apparatus is in the server computer, except the presenter, which is in the client computer. The user receives information accessed from the client computer.

It should be obvious to those skilled in the art that different elements in the present invention can be implemented in hardware or software or both. For example, the determinator and the query engine can be written in software, or can be on a circuit, such as a field-programmable-gate-array, where the program embodying the determinator and the query engine is burnt into a circuit. As another example, a processing unit 660 can implement the determinator; a main memory 662 can store the user profile; the same or a different processing unit can implement the retriever and the query engine; and the same main memory or a different memory can store the learning material storage medium.

One embodiment of the present invention can be implemented in a Web server. The server includes a HTTP server or program that understands HTTP or equivalent protocol. Just as an example, the name of the server is www.joblearn.com.

A user executes his browser in his computer to access learning materials by entering an URL, such as the following:

http://www.joblearn.com/job/
   user=tassels&subject?vendor=microsoft&product=
   excel From the URL, the browser determines that the protocol to use is HTTP. The browser also determines that the data packets are constructed based on the TCP format to establish a connection with the Web server, as specified by the HTTP protocol.

The browser then extracts the name of the Web server from the second component of the URL—www.joblearn.com—and attempts to establish a connection to the server.

To establish the connection, the browser can identify the IP address of the server. For example, the browser may retrieve the IP address from a domain name server.

Based on the IP address, the browser sends a request to the Web server to establish a TCP connection with the HTTP program running on the server. This can be through establishing the connection to the server with the default TCP port number, 80, for the HTTP program.

After the Web server receives and accepts the request, the browser transmits to the Web server other portions of the URL—
   job/user=tassels&subject?vendor=microsoft&product=
   excel.

The Web server examines them, and invokes a program named job. Assume that previously a Web master has configured the Web server to identify the term, job, at that part of the URL as an indication of invoking an embodiment of the present invention. The Web server also determines that the remaining portions of the URL is a CGI script. To simplify the description, instead of stating that the program, job, does a certain task, the description states that the Web server does the task.

The script indicates that the user is identified as tassels. Based on information previously stored, the Web server, based on the program, job, determines the identifier belong to a learning user. The Web server further determines that tassels intends to learn Microsoft Corporation's product Excel. Appropriate learning materials are then re-transmitted back to the browser to be presented to the learner.

In the above example, information is accessed through a HTTP server. Other commonly available accessing mechanisms are also applicable, such as JDBC or CORBA.

In addition to learning, the user may be asked to update changes in his profile, such as changes in his learning objectives. For example, he has changed his interest, and presently, he wants to learn how to build a house. Based on his availability, appropriate classes and/or learning materials are directed to him.

The Web server can also track his progress as he is learning. In this example, assume that classes are available through his computer. The server can perform a number of tracking tasks. For example, the Web server can mark the screen he looks at before he logs off from the server; the Web server can keep track of the duration of time for him to finish the course; and the server can keep track of whether or not he has graduated from the course. His user profile can be updated by such tracked information and analyzed data. Also, such information regarding the learning user can be accessed by institute users.

In another example, assume that the user is an institute user who may be interested in generating an advertisement on the Web server. As an example, a Web page generated by the Web server for an institute user includes a dialog box with an advertising button. Clicking that button by the institute user brings up an advertising file upload page, which can include questions, such as the size of the advertisement, the location, the pricing structure, and the time to post the advertisement. The location can specify the area on a typical screen, and the subject matter the screen is displaying. The user also can attach to the file, her advertisement clip, which can be a html page, a Java applet, an audio stream, animated streaming data, such as a video stream or a multimedia stream, or other file formats, or some combination of the above. The video stream or multimedia stream may be compressed by standard algorithms, such as based on MPEG format. The advertisement clip can be used as a banner and can be linked to learning materials related to the products sold by the institute user. When such learning materials are shown on a screen, the advertisement banner will be shown also. Through the institute user's browser, he can upload the file with the attachment clip to the Web server. In one embodiment, the advertisement clip can be hypertext-linked to the institute user's home page.

The Web server can monitor the number of hits on the page with the advertisement, or the number of times the clip or the advertisement was accessed. The Web server can also monitor the number times the institute's own home page has been hypertext-linked. Such information can be stored as information regarding the corresponding users accessing the clip or linking to the institute user's home page. If the users are learning users, such information can be considered as information regarding the learning users. Also, such information can be stored in the institute user profile area.

The institute user may like to change its advertisement on the Web server. In one embodiment, she is allowed to modify the scripts for the Java applet or the html page. She may be allowed to generate a modified clip to be uploaded to the Web server.

The institute user may be interested in accessing her profile to determine the number of hits on the clip. Statistics, such as the type of users accessing that clip, can also be stored in the profile area of the institute user.

The usage by the institute user with the results can be tracked, and stored in the institute user profile area.

Using a Web server to host the apparatus or a part of the apparatus, 200, can make economic sense. The price of developing the apparatus, or a portion of the apparatus, 200, on a Web server and maintaining it may cost a few million dollars. However, once developed, many users can access information through it from many places and at any time. If the learning users do not have to pay much to learn from it, one main obstacle of learning—tuition—is removed. Not only can the server (a) give the learning users the freedom to choose when, and in many occasions, where to learn, and (b) guide the users to the appropriate learning materials to fill their individual needs, learning from the server is also relatively inexpensive. Many more will learn and benefit from the invention. This will enrich them, help their career and, ultimately, help their employers and the society.

From another perspective, with many people learning from the server, a large database of information regarding learning users can be created. Many institute users are interested in the server in view of the large database of information regarding learning users, and the heavy traffic by those users. Institute users are interested for many different reasons. For example, they might want to use it to hire employees. For companies to succeed, they need the right employees, and they are willing to pay recruiters to get them. As an illustration, assume a company hires 25 employees per year from the server, and the average annual income with benefit of the 25 employees is $50,000. The company normally pays at least 20% of the annual income to recruiters. This translates to paying the recruiters $250,000 per year.

In additional to recruiting, the company can use the server to advertise their products and their jobs to users interested in them. Those users can be easily identified by, for example, the learning materials they work on, and their preferences as shown in their user profiles.

The company may also want to use the server to support their products. This can be done by having learning materials regarding their products available for learning users of the server.

The company can also use the server as to find out users' interest in their products. With learning materials on the products at the server, the company can measure users' interest in different features of the products by identifying how often materials regarding different features are being accessed, as discussed above.

Thus, institute users are willing to make reasonable payments to use the server. They are probably willing to pay much higher than what learning users are willing to pay. The institute users might even prefer to provide learning users with free access to the server. This is because the institute users are interested in lots of information regarding learning users, and a lot of traffic through the server.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention claimed is:

1. A computing apparatus comprising:
   at least a first computing device; and
   one or more networked storage devices accessible at least via a network,
   the one or more networked storage devices coupled to the first computing device, and
   the one or more networked storage devices to have stored thereon instructions that, when executed, cause the computing apparatus to:

receive, via a web server, a web request from a user using a second computing device to access content stored in the computing apparatus, via a network that includes the Internet, the web request, based on HTTP protocol, including a user identifier identifying the user, and a service identifier at least indicating the content to access, wherein at least a portion of the content is personalized to the user, to allow the user to learn from the at least a portion of the content;

identify the user based on the user identifier in the web request from the user;

allow the user, as identified, to have access to the content;

track, based on the user identifier of the user, at least some of the user's activities regarding usage of the computing apparatus over a period of time;

update, based on the user identifier of the user and the tracking, information regarding the user stored in the computing apparatus;

receive a request from a first entity using a third computing device to access at least some materials resulted from updated information based on activities of a group of users tracked by the computing apparatus, with the group of users including the user, via a network that includes the Internet, the request being linked to another user identifier, from the first entity, identifying the first entity;

identify the first entity based on the another user identifier from the first entity;

allow the first entity, as identified, to have access to the at least some materials of the group of users; and restrict the first entity, as identified, from obtaining information based on some materials on the user in view of an indication from the user, wherein the computing apparatus comprises instructions, when executed, to cause the computing apparatus to generate an accounting record to charge the first entity to access the at least some materials on the group of users.

2. A computing apparatus as recited in claim 1, wherein the computing apparatus comprises instructions, when executed, to cause the apparatus to:

receive a request from a second entity to use a fourth computing device to access at least some of the materials on the user via a network that includes the Internet; and cause the charging of the second entity so as to allow the second entity to access at least some of the materials on the user.

3. A computing apparatus as recited in claim 2, wherein at least some of the materials the first entity and the second entity are allowed to access are different.

4. A computing apparatus as recited in claim 1, wherein the computing apparatus comprises instructions, when executed, to cause the apparatus to:

receive a request from a second entity to use a fourth computing device to access at least materials on another user via a network that includes the Internet; and cause the charging of the second entity so as to allow the second entity to access at least some of the materials on the another user.

5. A computing apparatus as recited in claim 1, wherein the computing apparatus comprises instructions, when executed, to cause the apparatus to track materials regarding a plurality of users accessing information regarding a product, and provide such materials to the first entity.

6. A computing apparatus as recited in claim 1, wherein the computing apparatus comprises instructions, when executed, to cause the apparatus to:

track an area of the content accessed by a plurality of users; and determine whether to emphasize the area of the content at least in view of the number of the plurality of users.

7. A computing apparatus as recited in claim 1, wherein the computing apparatus comprises instructions, when executed, to cause the apparatus to analyze at least some of the materials on the user based on at least a need of the first entity, and wherein the first entity is charged and the charge on the first entity at least depends on whether the first entity has access to at least some of the analysis.

8. A computing apparatus as recited in claim 1, wherein the computing apparatus comprises instructions, when executed, to cause the apparatus to analyze at least some of the materials on the group of users based on at least a need of the first entity, and wherein the first entity is charged, and the charge on the first entity at least depends on the number of times the first entity has accessed at least some of the analysis.

9. An article comprising:

one or more non-transitory networked storage media having stored thereon instructions executable by at least a first computing device in a computing apparatus to:

receive, via a web server, a web request from a user using a second computing device to access content, via a network that includes the Internet, the web request, based on HTTP protocol, including a user identifier identifying the user, and a service identifier at least indicating the content to access, wherein at least a portion of the content is personalized to the user, to allow the user to learn from the at least a portion of the content;

identify the user based on the user identifier in the web request from the user;

allow the user, as identified, to have access to the content;

track, based on the user identifier of the user, at least some of the user's activities, over a duration of time, regarding usage of the computing apparatus;

update, based on the user identifier of the user and the tracking, information regarding the user stored in the computing apparatus;

receive a request from a first entity using a third computing device to access at least some materials resulted from the updated information on the user, via a network that includes the Internet, the request being linked to another user identifier, from the first entity, identifying the first entity;

identify the first entity based on the another user identifier from the first entity;

allow the first entity, as identified, to have access to the at least some materials on the user; and restrict the first entity, as identified, to accessing some materials on the user, in view of an indication from the user, wherein the one or more non-transitory networked storage media comprise instructions that are executable to cause the generating of an accounting record to charge the first entity to access the at least some materials on the user.

10. An article as recited in claim 9 wherein the one or more non-transitory networked storage media comprise instructions that are executable to:
receive a request from a second entity to use a fourth computing device to access at least some of the materials on the user via a network that includes the Internet; and
cause the charging of the second entity so as to allow the second entity to access at least some of the materials on the user.

11. An article as recited in claim 10, wherein at least some of the materials on the user the first entity and the second entity are allowed to access are different.

12. An article as recited in claim 9, wherein the one or more non-transitory networked storage media comprise instructions that are executable to:
receive a request from a second entity to use a fourth computing device to access at least materials on another user via a network that includes the Internet; and
cause the charging of the second entity so as to allow the second entity to access at least some of the materials on the another user.

13. An article as recited in claim 9 wherein the one or more non-transitory networked storage media comprise instructions that are executable to track materials regarding a plurality of users accessing information regarding a product, and provide such materials to the first entity.

14. An article as recited in claim 9 wherein the one or more non-transitory networked storage media comprise instructions that are executable to:
track an area of the content accessed by a plurality of users; and
determine whether to emphasize the area of the content at least in view of the number of the plurality of users.

15. An article as recited in claim 9:
wherein the one or more non-transitory networked storage media comprise instructions that are executable to analyze at least some of the materials on the user based on at least a need of the first entity, and
wherein the first entity is charged and the charge on the first entity at least depends on whether the first entity has access to at least some of the analysis.

16. An article as recited in claim 9:
wherein the one or more non-transitory networked storage media comprise instructions that are executable to analyze at least some of the materials on the user based on at least a need of the first entity, and
wherein the first entity is charged and the charge on the first entity at least depends on the number of times the first entity has accessed at least some of the analysis.

17. A computing apparatus as recited in claim 1, wherein at least some of the content indicated in the service identifier in the web request from the user includes a product and the name of a company providing the product.

18. An article as recited in claim 9, wherein at least some of the content indicated in the service identifier in the web request from the user includes a product and the name of a company providing the product.

19. A computing apparatus comprising:
at least a first computing device; and
one or more networked storage devices accessible at least via a network,
the one or more networked storage devices coupled to the first computing device, and
the one or more networked storage devices to have stored thereon instructions that, when executed, cause the computing apparatus to:
receive, via a web server, a web request from a user using a second computing device to access content stored in the computing apparatus, via a network that includes the Internet, the web request, based on HTTP protocol, including a user identifier identifying the user, and a service identifier at least indicating the content to access, wherein advertising materials from a first entity to be sent to the user, and wherein at least a portion of the content is personalized to the user, to allow the user to learn from the at least a portion of the content;
identify the user based on the user identifier in the web request from the user;
allow the user, as identified, to have access to the content;
track, based on the user identifier of the user, at least some of the user's activities, over a duration of time, regarding usage of the computing apparatus;
update, based on the user identifier of the user and the tracking, information regarding the user stored in the computing apparatus;
receive a request from the first entity using a third computing device to access at least some materials resulted from updated information based on activities of a group of users tracked by the computing apparatus, with the group of users including the user, via a network that includes the Internet, the request being linked to another user identifier, from the first entity, identifying the first entity;
identify the first entity based on the another user identifier from the first entity;
allow the first entity, as identified, to have access to the at least some materials of the group of users; and
restrict the first entity, as identified, from obtaining information based on some materials on the user, in view of an indication from the user,
wherein the computing apparatus comprises instructions, when executed, to cause the computing apparatus to generate an accounting record to charge the first entity to access the at least some materials on the group of users.

20. A computing apparatus as recited in claim 1, wherein the computing apparatus comprises instructions, when executed, to cause the apparatus to receive advertising materials from the first entity.

21. A computing apparatus as recited in claim 20, wherein the computing apparatus comprises instructions, when executed, to cause the apparatus to receive a piece of location information, regarding placement of the advertising materials relative to at least a portion of the content, for presenting at least the advertising materials and the at least a portion of the content.

22. A computing apparatus as recited in claim 20, wherein the computing apparatus comprises instructions, when executed, to cause the apparatus to receive a piece of timing information, regarding presenting the advertising materials.

23. A computing apparatus as recited in claim 20, wherein the computing apparatus comprises instructions, when executed, to cause the apparatus to receive a piece of timing information, regarding a duration of time to present the advertising materials.

24. A computing apparatus as recited in claim 20,
wherein the computing apparatus comprises instructions, when executed, to cause the apparatus to monitor the number of times the advertising materials has been accessed by a plurality of users, and
wherein the computing apparatus comprises instructions, when executed, to cause the computing apparatus to allow the first entity to receive the number of times the advertising materials has been accessed by the plurality of users.

25. An article comprising:
one or more non-transitory networked storage media having stored thereon instructions executable by at least a first computing device in a computing apparatus to:
receive, via a web server, a web request from a user using a second computing device to access content, via a network that includes the Internet, the web request, based on HTTP protocol, including a user identifier identifying the user, and a service identifier at least indicating the content to access, wherein advertising materials from a first entity to be sent to the user, and wherein at least a portion of the content is personalized to the user, to allow the user to learn from the at least a portion of the content;
identify the user based on the user identifier in the web request from the user;
allow the user, as identified, to have access to the content;
track, based on the user identifier of the user, at least some of the user's activities, over a duration of time, regarding usage of the computing apparatus;
update, based on the user identifier of the user and the tracking, information regarding the user stored in the computing apparatus;
receive a request from the first entity using a third computing device to access at least some materials resulted from updated information based on activities of a group of users tracked by the first computing device, with the group of users including the user, via a network that includes the Internet, the request being linked to another user identifier, from the first entity, identifying the first entity;
identify the first entity based on the another user identifier from the first entity;
allow the first entity, as identified, to have access to the at least some materials of the group of users; and
restrict the first entity, as identified, from obtaining information based on some materials on the user, in view of an indication from the user,
wherein the one or more non-transitory networked storage media comprise instructions that are executable to cause the generating of an accounting record to charge the first entity to access the at least some materials on the group of users.

26. An article as recited in claim 9, wherein the one or more non-transitory networked storage media comprise instructions that are executable to receive advertising materials from the first entity.

27. An article as recited in claim 25, wherein the one or more non-transitory networked storage media comprise instructions that are executable to receive a piece of location information, regarding placement of the advertising materials relative to at least a portion of the content, for presenting at least the advertising materials and the at least a portion of the content.

28. An article as recited in claim 25, wherein the one or more non-transitory networked storage media comprise instructions that are executable to receive a piece of timing information, regarding presenting the advertising materials.

29. An article as recited in claim 25, wherein the one or more non-transitory networked storage media comprise instructions that are executable to receive a piece of timing information, regarding a duration of time to present the advertising materials.

30. An article as recited in claim 25,
wherein the one or more non-transitory networked storage media comprise instructions that are executable to monitor the number of times the advertising materials has been accessed by a plurality of users, and
wherein the one or more non-transitory networked storage media comprise instructions that are executable to allow the first entity to receive the number of times the advertising materials has been accessed by the plurality of users.

31. A computing apparatus as recited in claim 1 wherein the user is an employee of the first entity, and the first entity is a company.

32. A computing apparatus as recited in claim 1 wherein the user is a student, not an employee, of the first entity, and the first entity is a school.

33. An article as recited in claim 9 wherein the user is an employee of the first entity, and the first entity is a company.

34. An article as recited in claim 9 wherein the user is a student, not an employee, of the first entity, and the first entity is a school.

35. A computing apparatus as recited in claim 19, wherein at least a portion of the advertising materials are personalized to the user, based on at least some of the updated information stored in the computing apparatus regarding the user.

36. A computing apparatus as recited in claim 19, wherein the computing apparatus comprises instructions, when executed, to cause the apparatus to track number of times the advertising materials have been shown to a plurality of users.

37. A computing apparatus as recited in claim 19,
wherein the advertising materials include an actionable item that reacts to a user action, and
wherein the computing apparatus comprises instructions, when executed, to cause the apparatus to track number of times the actionable item has been acted on via the user action.

38. A computing apparatus as recited in claim 19,
wherein the advertising materials include an actionable item that reacts to a user action, and
wherein the actionable item is configured to result in the playing of a video in reacting to the user action.

39. An article as recited in claim 25, wherein at least a portion of the advertising materials are personalized to the user, based on at least some of the updated information stored in the computing apparatus regarding the user.

40. An article as recited in claim 25, wherein the one or more non-transitory networked storage media comprise instructions that are executable to track number of times the advertising materials have been shown to a plurality of users.

41. An article as recited in claim 25,
wherein the advertising materials include an actionable item that reacts to a user action, and wherein the one or more non-transitory networked storage media comprise instructions that are executable to track number of times the actionable item has been acted on via the user action.

42. An article as recited in claim 25,
wherein the advertising materials include an actionable item that reacts to a user action, and
wherein the actionable item is configured to result in the playing of a video in reacting to the user action.

43. An article as recited in claim 25, wherein the one or more non-transitory networked storage media comprise instructions that are executable to track materials regarding a plurality of users accessing information regarding a product, and provide such materials to the first entity.

44. A computing apparatus as recited in claim 19, wherein the computing apparatus comprises instructions, when executed, to cause the computing apparatus to track materials regarding a plurality of users accessing information regarding a product, and provide such materials to the first entity.

45. A computing apparatus as recited in claim 19, wherein at least some of the content indicated in the service identifier in the web request from the user includes a product and the name of a company providing the product.

\* \* \* \* \*